(12) United States Patent
Shinozaki

(10) Patent No.: US 8,588,342 B2
(45) Date of Patent: Nov. 19, 2013

(54) MOBILE TERMINAL FOR PERFORMING A COMMUNICATION BY USING SUB CARRIERS

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1086 days.

(21) Appl. No.: 12/071,654

(22) Filed: Feb. 25, 2008

(65) Prior Publication Data

US 2008/0159428 A1 Jul. 3, 2008

Related U.S. Application Data

(63) Continuation of application No. PCT/JP2005/015478, filed on Aug. 25, 2005.

(51) Int. Cl.
*H04L 27/00* (2006.01)
*H04K 1/10* (2006.01)

(52) U.S. Cl.
USPC .......................................... 375/326; 375/260

(58) Field of Classification Search
USPC ................... 375/326, 260, 259, 324, 322, 316
See application file for complete search history.

(56) References Cited

U.S. PATENT DOCUMENTS

| | | | |
|---|---|---|---|
| 6,201,972 | B1 | 3/2001 | Hamabe |
| 6,839,335 | B1 | 1/2005 | Sudo |
| 7,020,110 | B2 | 3/2006 | Walton et al. |
| 8,111,660 | B2 | 2/2012 | Bossert et al. |
| 2002/0105947 | A1 | 8/2002 | Kitagawa et al. |
| 2004/0071105 | A1 | 4/2004 | Maeda et al. |
| 2004/0076172 | A1 | 4/2004 | Sano |
| 2005/0128993 | A1* | 6/2005 | Yu et al. ........................ 370/342 |
| 2005/0208906 | A1 | 9/2005 | Miyoshi et al. |
| 2006/0198293 | A1 | 9/2006 | Nishio et al. |
| 2006/0234715 | A1* | 10/2006 | Cho et al. ...................... 455/447 |
| 2007/0140102 | A1* | 6/2007 | Oh et al. ....................... 370/208 |
| 2009/0258600 | A1 | 10/2009 | Nishio et al. |

FOREIGN PATENT DOCUMENTS

| | | |
|---|---|---|
| EP | 1509016 | 2/2005 |
| EP | 1531594 | 5/2005 |
| JP | 11-027231 | 1/1999 |
| JP | 11-205205 | 7/1999 |
| JP | 11-275625 | 10/1999 |
| JP | 2000-209145 | 7/2000 |
| JP | 2001-024618 | 1/2001 |

(Continued)

OTHER PUBLICATIONS

Maeda et al., "Performance of the Delay Profile Information Channel based Subcarrier Transmit Power Control Technique for OFDM/FDD Systems", The Transactions of the Institute of Electronics, Information and Communication Engineers B, vol. J84-B No. 2, IEICE, pp. 205-213, Feb. 1, 2001.

Tsubaki et al., "OFDM Subcarrier Information Aided ARQ for Wireless ATM", Proceedings of the 1997 Communications Society Conference of IEICE, p. 332, Aug. 13, 1997.

(Continued)

*Primary Examiner* — Chieh M Fan
*Assistant Examiner* — Brian J Stevens
(74) *Attorney, Agent, or Firm* — Fujitsu Patent Center

(57) ABSTRACT

A mobile terminal includes a data generation unit operable to generate first data and second data and a radio transmission unit operable to perform radio transmission of the first data by using a first sub carrier group according to an orthogonal frequency divisional multiplexing (OFDM) method and to perform radio transmission of the second data by using a second sub carrier group according to the OFDM method.

19 Claims, 22 Drawing Sheets

(56) References Cited

FOREIGN PATENT DOCUMENTS

| | | | | |
|---|---|---|---|---|
| JP | 2001-339361 | 12/2001 | | |
| JP | 2002-246958 | 8/2002 | | |
| JP | 2003-060605 | 2/2003 | | |
| JP | 2003-169036 | 6/2003 | | |
| JP | 2003169036 | 6/2003 | | |
| JP | 2004-129249 | 4/2004 | | |
| JP | 2004-134978 | 4/2004 | | |
| JP | 2005-142935 A | 6/2005 | | |
| WO | WO-2004/093344 | 10/2004 | | |
| WO | WO-2005/015801 | 2/2005 | | |
| WO | WO 2005020613 A2 * | 3/2005 | ............... | H04Q 7/36 |
| WO | WO-2006/017850 | 2/2006 | | |
| WO | WO 2007000180 A1 * | 1/2007 | ............... | H04L 27/34 |

OTHER PUBLICATIONS

Notice of Reason for Rejection dated Jul. 20, 2010 received in corresponding Japanese Patent Application No. 2007-531997.

Japanese Office Action mailed by JPO and corresponding to Japanese application No. 2010-261093 on Jul. 19, 2011, with English translation.

Japanese Questioning—Appeal Board mailed Aug. 21, 2012 for corresponding Japanese Application No. 2010-261094, with English-language Translation.

Extended European Search Report mailed by EPO and corresponding to European application No. 05774667.9 on Jul. 2, 2012.

Fujii T. et al., "SCS-MC-CDMA System with Best Effort Cell Structure," Information and Communication Labs., Japan Telecom, 2005 IEEE International Conference on Seoul, Korea; Piscataway, NJ, USA, IEEE vol. 4 (May 16-20, 2005), pp. 2213-2217.

* cited by examiner

FIG. 1

| BRANCH | SUB CARRIER | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| #0 | ○ | ○ | ○ | ○ | | | | × | | | | | | | | | |
| #1 | | | × | | ○ | ○ | ○ | ○ | ○ | ○ | ○ | × | ○ | ○ | × | ○ | ○ |

TRANSMISSION CARRIER: ○, NON-TRANSMISSION CARRIER: BLANK
(CARRIER THAT HAS BEEN INFLUENCED BY FREQUENCY SELECTIVE FADING: ×)

FIG. 2

| TPC INFO. | 1 | 2 | 3 | 4 | 5 | 6 | 7 | 8 | 9 | 10 | COUNT | CONDITION |
|---|---|---|---|---|---|---|---|---|---|---|---|---|
| UP | ○ | ○ | ○ | | | ○ | ○ | ○ | ○ | ○ | 8 | IT IS DETERMINED THAT FADING HAS OCCURRED WHEN EIGHT OR MORE UP INSTRUCTIONS ARE ISSUED |
| DOWN | | | | ○ | ○ | | | | | | 2 | |

FIG. 9

| SUB CARRIER NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MANDATORY | BITMAP INDICATING WHETHER UPLINK FADING HAS OCCURRED AT EACH SUB CARRIER ||||||||||||||||
| OPTION | BITMAP INDICATING SUB CARRIER TO BE RECEIVED BY UE ||||||||||||||||

SUB CARRIERS

FIG. 10

| SUB CARRIER NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MANDATORY | BITMAP INDICATING SUB CARRIER TO BE RECEIVED BY NODE B (FOR NODE B #0) | | | | | | | | | | | | | | | |
| MANDATORY | BITMAP INDICATING SUB CARRIER TO BE RECEIVED BY NODE B (FOR NODE B #1) | | | | | | | | | | | | | | | |
| OPTION | BITMAP INDICATING SUB CARRIER TO BE RECEIVED BY UE (FOR NODE B #0) | | | | | | | | | | | | | | | |
| OPTION | BITMAP INDICATING SUB CARRIER TO BE RECEIVED BY UE (FOR NODE B #1) | | | | | | | | | | | | | | | |

SUB CARRIERS

FIG. 11

| | | 1 | 2 | 3 | 4 | 5 | 6 | 7 | 8 | 9 | 10 | 11 | 12 |
|---|---|---|---|---|---|---|---|---|---|---|---|---|---|
| FADING | BRANCH #0 | | ○ | ○ | | | | | | | | | |
| | BRANCH #1 | | | | | | | | ○ | | | | |
| ASSIGN-MENT | BRANCH #0 | | | | | | ▨ | ▨ | ▨ | ▨ | ▨ | ▨ | ▨ |
| | BRANCH #1 | ▨ | ▨ | ▨ | ▨ | ▨ | | | | | | | |

(SUB CARRIER)

FIG. 12

| | | 1 | 2 | 3 | 4 | 5 | 6 | 7 | 8 | 9 | 10 | 11 | 12 |
|---|---|---|---|---|---|---|---|---|---|---|---|---|---|
| FADING | BRANCH #0 | | | ○ | | | | | | | | ○ | |
| | BRANCH #1 | | ○ | | | | ○ | | | | | ○ | |
| ASSIGN-MENT | BRANCH #0 | | | | | | | | | | | | |
| | BRANCH #1 | | | | | | | | | | | | |

SUB CARRIER

FIG. 14

| | | 1 | 2 | 3 | 4 | 5 | 6 | 7 | 8 | 9 | 10 | 11 | 12 |
|---|---|---|---|---|---|---|---|---|---|---|---|---|---|
| FADING | BRANCH #0 | O | | O | | | | | | | | | |
| | BRANCH #1 | | | | O | | | | | | O | O | |
| ASSIGNMENT | BRANCH #0 | | | | | | | | | | | | |
| | BRANCH #1 | | | | | | | | | | | | |
| SF | | GROUP #0 | | | | GROUP #1 | | | | GROUP #2 | | | |

SUB CARRIER

MOBILE TERMINAL FOR PERFORMING A COMMUNICATION BY USING SUB CARRIERS

CROSS-REFERENCE TO RELATED APPLICATION

This is a continuation of Application PCT/JP2005/015478, filed on Aug. 25, 2005, now pending, the contents of which are herein wholly incorporated by reference.

BACKGROUND

The present invention relates to a technique suited to a mobile communication system in which data transmission is performed using multicarriers such as an orthogonal frequency and code division multiplexing (OFCDM) system and an orthogonal frequency division multiplexing (OFDM) system.

In the OFCDM system, code division multiplexing is performed using spreading codes in the orthogonal frequency division multiplexing (OFDM) system, where data is sent in parallel by using multiple sub carriers. The OFCDM system can achieve user multiplexing at the same frequency.

The OFCDM system has the following advantages.
(1) Immunity to narrowband interference
(2) Resistance to frequency selective fading
(3) High frequency use efficiency (because a frequency can be shared by sub carriers)
(4) Frequency domain processing can be performed.
   An outline of an OFCDM transmission method is described below (see Patent Document 1, for example).
<1> First, a transmission target information symbol is prepared.
<2> Error-correction encoding such as turbo encoding is applied to the information symbol.
<3> Predetermined data modulation processing (for example, QPSK modulation) is applied to the information symbol, to which the error-correction encoding has been applied.
<4> Serial-parallel conversion is applied to the modulated information symbol.
<5> According to a predetermined spreading factor (SF), the same number of copies of the modulated information symbol, to which the serial-parallel conversion has been applied, are made as the number of spreading cycles (spreading factor) of spreading code.
<6> Each of the information symbols obtained by the copying is multiplied by one chip of spreading code.
<7> The information symbols, each of which has been multiplied by spreading code, are multiplexed.
<8> Frequency and time transformation (inverse fast Fourier transformation (IFFT)) processing is applied to the multiplexed information symbols. As a result, an OFCDM transmission signal (orthogonal multicarrier signal) is generated.
<9> A guard interval (GI) is inserted to each of the information symbols in the OFCDM transmission signal.
<10> The OFCDM transmission signal which includes spread parallel symbols, is sent by radio communication using carriers (multicarriers) of various frequencies.

In the OFCDM system, transmission is performed using multiple sub carriers as shown in FIG. 22. Accordingly, even when frequency selective fading occurs, the fading influences only a certain sub carrier. Further, in the influenced sub carrier, this influence can be regarded as flat fading (simple attenuation). In this case, a signal-to-interference ratio (SIR) of the sub carrier is lower than a target value. Therefore, when the transmission power of the sub carrier is increased through sub carrier transmission power control (STPC), a problem to be caused by the frequency selective fading can be prevented.

In contrast to this, in a case of a single carrier as used in the code division multiple access (CDMA) system, the occurrence of frequency selective fading influences the entire transmission carrier. Accordingly, the entire transmission data is influenced. It was difficult to reduce this influence through transmission power control (TPC). In other words, when the single carrier is used, it was difficult to improve a bit error rate by reducing the influence caused by the frequency selective fading.

As described above, in a system in which radio transmission is performed using the sub carriers such as the OFCDM system, an influence caused by the frequency selective fading can be more suppressed through the STPC than in radio transmission using the single carrier.

However, the STPC may influence another call. Specifically, as shown in FIG. 23, in a certain mobile station ((MS): mobile terminal) #0, when a reception power level is dropped by an influence caused by the frequency selective fading, the mobile station #0 requests to increase transmission power. As a result, the mobile station #0 can ensure a desired SIR. However, such an increase in the transmission power may lead to an increase in noise component of a corresponding sub carrier to be received by another mobile station #1.

In order to solve this problem, there is proposed a method in which a sub carrier at which a reception level has been dropped is not used (for example, see Non-Patent Document 1).

Further, in view of a problem of a reduced transmission efficiency caused when such a sub carrier is simply not used, there is proposed a partial non-power allocation (PNPA) system in which punctured bits are allocated to a sub carrier that is not used (for example, Non-Patent Document 2).

In a diversity hand over (DHO) system in which a mobile station can communicate with multiple base stations, in 3GPP systems, identical data is sent to all transmission paths (branches) by a single carrier. In the reception side, data reproduction is performed by combining the pieces of data sent through the branches. In this case, there is a problem in that, when each piece of data is influenced by frequency selective fading in each of the branches, even if the reception side selects any combination of the data received from the branches when combining the data, reproduced data is also influenced by the frequency selective fading.

When soft hand over is performed, identical data flows through multiple transmission paths. This implies inefficiency in the use of channels while ensuring quality. For example, when a radio network controller ((RNC): base station control device) includes a function unit which performs data selection and combining, identical data is sent through each interface "Iub" (interface between the RNC and a node B (base station)), for both an uplink and a downlink.

Further, for uplink transmission, the mobile station sends identical data to all base stations, in 3GPP systems.

Patent Document 1: JP 2004-134978 A
Non-Patent Document 1: Toshimitsu TSUBAKI, Yoichi MATSUMOTO, Masahiro UMEHIRA, "Study of ARQ for wireless ATM using OFDM sub carrier information", Proceedings 1 of The Institute of Electronics, Information and Communication Engineers (IEICE) communication society conference in 1997, IEICE, p. 332, Aug. 13, 1997.
Non-Patent Document 2: Noriyuki MAEDA, Seiichi SAMPEI, Norihiko MORINAGA, "Characteristics in a sub carrier transmission power control method based on a delay profile information channel, for OFDM/FDD systems", IEICE Transactions on communications, Vol. J84-B No. 2, IEICE, pp. 205-207, 398th volume, Feb. 1, 2001.

SUMMARY

An object of aspects of the present invention is to provide a technique of improving the quality of communication performed between a mobile terminal and a base station.

Further, another object of the aspects the present invention is to provide a technique of performing efficient communication between a mobile terminal and a base station.

To solve the above-described problems, the aspects of the present invention adopts the following structure. That is, a first aspect provides a mobile terminal, including:
- a data generation operable to generate first data and second data; and
- a radio transmission unit operable to perform radio transmission of the first data by using a first sub carrier group according to an orthogonal frequency divisional multiplexing (OFDM) method and operable to perform radio transmission of the second data by using a second sub carrier group according to the OFDM method.

In the mobile terminal of the first aspect, it is preferred that the first data and the second data are a part of error-correction encoded data.

Further, it is preferable that the mobile terminal of the aspect further includes an information transmission unit operable to transmit information which identifies sub carriers included in the first sub carrier group and sub carriers included in the second sub carrier group among multiple sub carriers.

Further, in the mobile terminal of the first aspect, it is preferred that the first sub carrier group and the second sub carrier group are sub carrier groups obtained by dividing a sub carrier candidate group which includes a plurality of sub carriers based on a radio environment.

It is preferred that the mobile terminal according to the first aspect further includes:
- a radio environment measurement unit operable to measure radio environments of a plurality of sub carriers between a first antenna and the mobile terminal and radio environments of a plurality of sub carriers between a second antenna and the mobile terminal; and
- a sub carrier setting unit operable to set the first sub carrier group and the second sub carrier group based on results of the measurement, and
- that the data transmit by using the first sub carrier group is subject to receiving processing by a reception unit having the first antenna and the data sent by using the second sub carrier group is subject to receiving processing by a reception unit having the second antenna.

Further, a second aspect provides a mobile terminal including:
- a reception processing unit operable to receive different signals transmitted from a first antenna and a second antenna according to an orthogonal frequency division multiplexing (OFDM) method; and
- a transmission processing unit operable to transmit, to a base station for sending signals to the mobile terminal via the first antenna, information for designating a sub carrier group to be used by the base station upon transmitting one of the different signals from the base station to the mobile station, based on signals received from the base station.

Further, a third aspect provides a radio communication apparatus, which transmits and receives a multicarrier signal that uses a plurality of sub carriers, including:
- an acquisition unit operable to acquire, when there are a plurality of radio transmission paths for transmitting and receiving the multicarrier signals, radio environments of each of the radio transmission paths; and
- an assignment unit operable to assign sub carriers to be used for transmitting and/or receiving a multicarrier signal to each of the radio transmission paths based on the radio environments acquired by the acquisition means.

Further, a fourth aspect provides a base station apparatus, including:
- a second antenna different from a first antenna that transmits first data to a mobile station by using a first sub carrier group; and
- a transmission processing unit operable to transmit second data by using a second sub carrier group from the second antenna to the mobile station.

In the base station apparatus of the fourth aspect, it is preferable that the first antenna be provided to the base station apparatus or another base station apparatus.

Further, in the base station apparatus of the fourth aspect, it is preferable that the transmission processing unit transmits, to the mobile station, reception quality information on a signal from the base station received at the second antenna.

According to the aspects, it is possible to improve the quality of communication performed between a mobile terminal and a base station.

Further, according to the aspects, efficient communication can be performed between the mobile terminal and the base station.

BRIEF DESCRIPTION OF THE DRAWINGS

FIG. 1 is an explanatory diagram of an outline of the embodiment, and shows a table showing an example of an assignment state of sub carriers with respect to each branch when there are 16 sub carriers and two branches.

FIG. 2 shows a table showing an example of determination as to whether frequency selective fading has occurred.

FIG. 9 is a diagram showing a structural example of uplink feedback information.

FIG. 10 is a diagram showing a structural example of downlink feedback information.

FIG. 11 shows a table showing an example of assignment of sub carriers based on a fading occurrence state.

FIG. 12 shows a table showing an example of assignment of sub carriers based on a fading occurrence state.

FIG. 14 shows a table showing an example of assignment of sub carriers when SF is set to 4.

DETAILED DESCRIPTION

Figure 3:
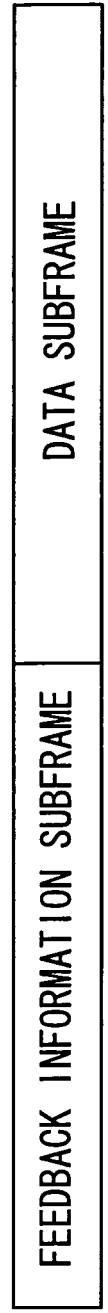
FIG. 3 is a diagram showing an example of a basic frame format used to send feedback information.

Hereinafter, an embodiment of the present invention will be described with reference to the drawings. A structure of the embodiment is an example, and the present invention is not limited to the structure of the embodiment.

<Outline of the Present Invention>

In the embodiment, whether each sub carrier can be used is determined in a multicarrier communication system such as an OFDM system (for example, an OFCDM system). This determination is performed based on a frequency selective fading occurrence state of each sub carrier, obtained by using a transmission power level of a multicarrier signal at a transmission side and/or a reception power level of the multicarrier signal at a reception side, for example.

Further, in the present embodiment, when multiple branches (radio transmission paths) are connected between the transmission side and the reception side of a multicarrier signal as in a case of performing diversity hand over (DHO), for example, assignment of sub carriers to be used by each branch is performed. This assignment of sub carriers is performed based on a frequency selective fading occurrence state, for example. At this time, the correspondence relation of a branch and a base station may be a one-to-one relation, or an n-to-one relation (where n is a natural number equal to or larger than 2). Specifically, one base station may be used for one branch, or one base station may be used for multiple branches.

FIG. 1 shows a table showing an example of an assignment state of sub carriers with respect to each branch when there are 17 sub carriers and two branches.

In FIG. 1, it is determined that a sub carrier indicated by a cross symbol "X" is not allowed to be used in the corresponding branch, due to an influence of frequency selective fading.

On the other hand, a sub carrier indicated by a circle symbol "O" is assigned to the corresponding branch as a transmission sub carrier based on the result of the determination as to whether to allow the use of the sub carrier.

In FIG. 1, sub carriers 0 to 3 are assigned to a branch #0, and sub carriers 4 to 16 are assigned to a branch #1. With this assignment, the transmission side and the reception side can send and receive data (radio signal) which is not influenced by frequency selective fading, by using the branches #0 and #1.

The embodiment can be applied, for example, to a communication system disclosed in a patent application titled "communication system and communication method" (International application number PCT/JP2005/0413, International filing date Mar. 9, 2005: Not published: Hereinafter, this patent application will be referred to as "prior application", and the invention according to this prior application will be referred to as "prior invention") which has already been filed by the inventor of the present application. In this communication system, when there are multiple base stations (branches), identical data is not sent to each of the base stations (branches), but the data is divided by the number of the branches (for example, when the number of the branches is N, data is divided by N) and each of the base stations sends division data (segment) through the corresponding branch. According to the communication system, a reduction in the amount of data to be sent through one branch can reduce the level of noise in a certain branch caused by another branch.

When the embodiment is applied to this communication system, the division data can be sent by using the above-described sub carriers assigned to each branch. Further, it is also possible to divide transmission target data in units of packet data units (PDUs) for radio link control (RLC) defined by 3GPP, or in units of logical channels (CHs), and assign division data to each branch.

<Assignment of Sub Carriers>

Next, a method of assigning sub carriers to a branch, according to an embodiment of the present invention will be described.

<<Fading Occurrence Determination Method>>

In this embodiment, the following method can be used as a method of determining the occurrence of frequency selective fading in a sub carrier.

(First Method: Estimation Based on Transmission Power Control Information)

When a transmission side and a reception side use a radio transmission path to perform communications, transmission power control (TPC) is generally performed. In a multicarrier communication system, the TPC can be performed for each sub carrier (STPC).

A brief description of TPC will be given. The reception side measures SIR of a signal received from the transmission side through the radio transmission path, and determines whether the measured SIR is lower or higher than a target SIR. When the measured SIR is lower than the target SIR, TPC information that instructs the transmission side to increase (up) the transmission power is generated. When the measured SIR is higher than the target SIR, TPC information that instructs the transmission side to reduce (down) the transmission power is generated. The TPC information is sent to the transmission side. According to the instruction in the TPC information, the transmission side controls (increases or reduces) the transmission power of a signal to be sent to the reception side.

The transmission side of a multicarrier transmission signal (OFCDM transmission signal) can detect a reception power fluctuation in each sub carrier by using the TPC information. Specifically, from an increased amount of power for a given period of time, it can be determined whether a sub carrier that is a target of power control has been influenced by frequency selective fading.

FIG. 2 shows a table showing an example of determination as to whether frequency selective fading has occurred. In FIG. 2, every time TPC information is received, the transmission side accumulates the content of an instruction of the TPC information in a storage device predetermined times (ten times in the example of FIG. 2). When the contents of instructions have been accumulated the predetermined times, it is determined whether the accumulated contents satisfy the determination condition indicated by information used for determining the occurrence of fading, which is stored in advance in the storage device.

The example of FIG. 2 shows a determination condition in which it is determined that fading has occurred when eight or more increase instructions are included in ten pieces of TPC information. In FIG. 2, eight increase instructions are included in ten instructions, so the transmission side determines that this sub carrier has been influenced by fading (that fading has occurred).

The first method can be performed also in the reception side when TPC information to be sent to the transmission side is accumulated.

(Second Method: Reception Level Determination in the Reception Side)

The reception side of a multicarrier signal can determine whether fading has occurred, by calculating an average reception level of multiple sub carriers in a multicarrier signal for a predetermined measurement period of time, and comparing the average reception level with the reception level of a sub carrier that is a determination target. For calculation of the average reception level, the reception level of the determination target sub carrier may be included or excluded.

Specifically, the reception side measures the reception levels of the multiple sub carriers for the predetermined measurement period of time or at predetermined measurement timing, and calculates the average reception level for the measurement period of time. Next, the reception side extracts the reception level of the determination target sub carrier, and calculates the difference between the extracted reception level and the average reception level (reception level difference=average reception level−determination target reception level).

Next, the reception side reads data (for example, a reference value for a reception level) used for determining whether fading has occurred, which is stored in advance in the storage device, and compares the reference value with the difference. When the difference is larger than the reference value (reception level difference>reference value), the reception side determines that fading has occurred. On the other hand, when the difference is equal to or smaller than the reference value (reception level difference≤reference value), the reception side determines that fading has not occurred.

(Third Method: a Combination of the First Method and the Second Method)

The above-described first method and second method can be combined and used as a third method. Specifically, whether fading has occurred can be determined based on a determination result (fading information (for example, 0 (occurred) or 1 (not occurred)) obtained by the first method and a determination result (fading information (for example, 0 (occurred) or 1 (not occurred)) obtained by the second method.

For example, it is determined that fading has occurred when the logical product or the logical sum of pieces of the fading information obtained by the first and second methods is calculated and its result shows "1".

<<Feedback Information>>

The determination results (fading information) obtained by the above-described first to third methods can be sent to the other side as feedback information when sub carriers are assigned based on the fading information in the other side.

As described above, the first method can be performed in one of the transmission side and the reception side of a multicarrier signal. When the first method is performed in the transmission side, fading information obtained by the first method can be sent to the reception side as feedback information. On the other hand, when the first method is performed in the reception side, fading information obtained by the first method can be sent to the transmission side as feedback information.

The second method is performed in the reception side of a multicarrier signal. Fading information obtained by the second method can be sent to the transmission side as feedback information.

The third method is performed in one of the transmission side and the reception side of a multicarrier signal. When the third method is performed in the reception side, the reception side can send a determination result of the third method obtained from determination results of the first and second methods performed in the reception side, to the transmission side as feedback information.

On the other hand, when the third method is performed in the transmission side, the transmission side can perform the third method based on fading information obtained by the first method performed in the transmission side and fading information (feedback information) obtained by the second method performed in the reception side, and send its result to the reception side as feedback information.

Note that an operation may be performed in which a measurement result of reception power level fluctuation, obtained by the first method, and measurements of reception levels and a result of calculation of an average reception level, obtained by the second method, are sent to the other side as feedback information and the other side performs fading occurrence determination based on the sent information.

Note that any known method can be used to determine the occurrence of frequency selective fading at a sub carrier.

<<Feedback Method>>

As described above, fading information of each sub carrier obtained in one of the transmission side and the reception side can be sent to the other as feedback information.

The feedback information can be sent to the other side together with transmission target data, for example. FIG. 3 shows an example of a basic frame format used to send the feedback information.

As shown in FIG. 3, in a frame, a data area (data subframe) for storing data and a feedback information area (feedback information subframe) for storing feedback information are defined.

Figure 4:
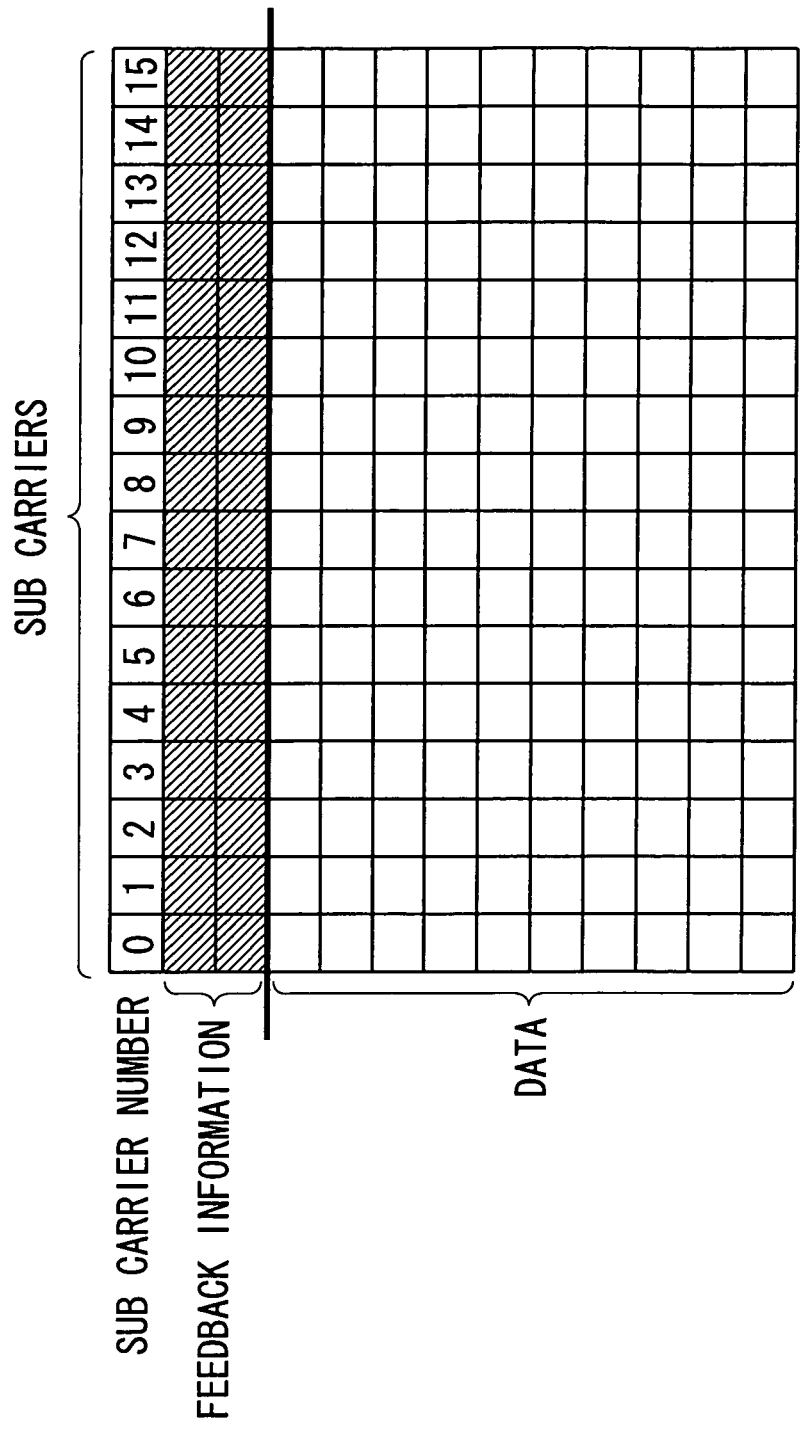
FIG. 4 is a diagram schematically showing a multicarrier signal in which a data area and a feedback information area are defined.

FIG. 4 is a diagram schematically showing a multicarrier signal (for example, OFCDM signal) in which a data area and a feedback information area are defined. FIG. 4 shows a case where the number of sub carriers is 16.

In an example shown in FIG. 4, the feedback information area is defined in the top two rows (two blocks) for all the sub carriers and the data area is defined following the feedback information area. However, the position of the feedback information area may be arbitrarily located for each of the sub carriers. In other words, the positions of the feedback information areas may differ among each of the sub carriers. Further, a percentage of the feedback information area in each sub carrier (the number of blocks used for the feedback information area of FIG. 4) may also be determined in a desired manner.

The feedback information area is preferably defined in all sub carriers to be used for a multicarrier signal. This is because, even in a case where a certain sub carrier is not used for data transmission as a result of sub-carrier assignment, when feedback information is assigned to the sub carrier, the reception level of the sub carrier can be measured in the reception side.

The feedback information is not necessarily assigned to a sub carrier that is not used. For example, in FIG. 4, when sub carriers #0 to #7 are not used, feedback information of the sub carriers #0 to #7 may be assigned to sub carriers #8 to #15. In this case, dummy data for reception level measurement can also be assigned to the sub carriers #0 to #7.

Note that the data area includes TPC information (TPC bit) of each sub carrier which is to be sent from the reception side of a radio signal to the transmission side thereof.

<<Feedback Loop>>

Figure 5:
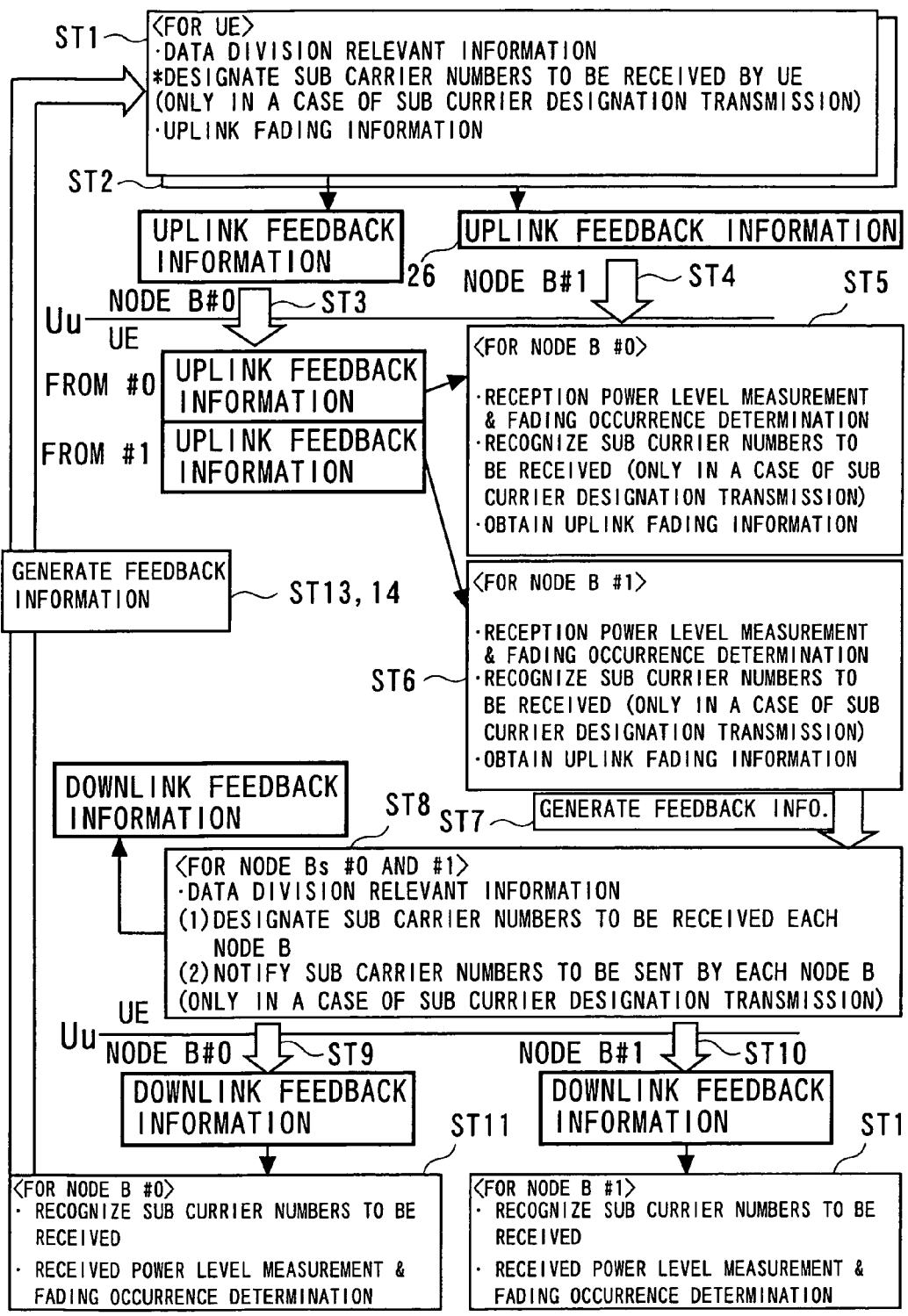
FIG. 5 is a diagram showing an example of a feedback loop using uplink and downlink.

FIG. 5 is a diagram showing an example of a feedback loop using uplink and downlink. In an example shown in FIG. 5, a mobile station (UE (user equipment), mobile terminal) is connected to multiple (a plurality of) nodes B (base stations: #0 and #1) through uplinks (from the mobile station to the base stations) and downlinks (from the base stations to the mobile station) via interfaces "Uu" (interfaces between the mobile station and the base stations).

In FIG. 5, as a fading occurrence determination method, the second method is performed for the uplinks in the mobile station and the second method is performed for the downlinks in the mobile station.

In the example shown in FIG. 5, for uplink communication, the mobile station can divide multiple sub carriers to be used for multicarrier signal transmission into multiple sub-carrier groups the number of which corresponds to the number of transmission paths (branches: in this example, the base stations #0 and #1), and assign the sub-carrier groups to the branches. In other words, the mobile station can determine sub carriers to be used by each of the multiple branches used for the uplink communication.

Further, in the example shown in FIG. 5, for downlink communication, when the multiple branches (the base stations #0 and #1) use different sub carriers (different sub-carrier group), the mobile station can determine sub carriers (sub-carrier group) to be used by each of the branches. In this embodiment, downlink communication in which the multiple branches use different sub carriers is referred to as "downlink sub carrier designation transmission".

In FIG. 5, each of the base stations #0 and #1 generates feedback information (uplink feedback information) to be sent to the mobile station through the downlink (ST1, ST2).

The uplink feedback information is used for the mobile station sending data to each of the base stations #0 and #1 through the uplinks. The uplink feedback information includes data division relevant information (also referred to as "sub carrier division information") and uplink fading information.

The data division relevant information includes designation of sub carrier numbers (sub carriers to be received by the mobile station from each of the base stations) to be used when each of the base stations #0 and #1 performs the downlink sub carrier designation transmission. The sub carrier division information is included only when the mobile station determines sub carriers to be used by each of the base stations #0 and #1 in order to perform the downlink sub carrier designation transmission.

The uplink fading information indicates a result (fading information) of frequency selective fading occurrence determination for each sub carrier, performed in each of the base stations #0 and #1.

The uplink feedback information sent from each of the base stations #0 and #1 is received by the mobile station through the interfaces Uu for the downlinks (ST3, ST4).

The mobile station performs the following processing (ST5, ST6) based on the uplink feedback information sent from each of the base stations #0 and #1. In ST5, regarding the base station #0, the mobile station performs the reception power level determination and the fading occurrence determination, for each sub carrier of the downlink used by the base station #0. Further, the mobile station recognizes the sub carrier numbers to be received from the base station #0 through the downlink, based on the sub carrier numbers included in the uplink feedback information sent from the base station #0. This recognition is performed only in the case of the downlink sub carrier designation transmission. Further, the mobile station obtains the uplink fading information which is included in the uplink feedback information sent from the base station #0.

In ST6, the mobile station performs the same processing as the processing (ST5) performed for the uplink feedback information sent from the base station #0, based on the uplink feedback information sent from the base station #1.

Next, the mobile station generates downlink feedback information to be sent to each of the base stations #0 and #1 through the uplinks (ST7, ST8). The downlink feedback information is used for each of the base stations #0 and #1 sending data to the mobile station through the downlink.

The downlink feedback information includes data division relevant information (sub carrier division information). The sub carrier division information includes (1) designation information on sub carrier numbers to be received by each of the base stations #0 and #1 through the uplink and (2) designation information (notification information) on sub carrier numbers to be used by each of the base stations #0 and #1 for downlink transmission.

As described above, the mobile station can determine sub carriers (sub carrier group) to be used by each of the base stations (branches) for data transmission and reception in at least one of uplink and downlink communications. When the downlink feedback information is generated (ST7), the mobile station determines, based on the uplink fading information from each of the base stations #0 and #1, sub carrier numbers to be received by each of the base stations #0 and #1 in the uplink communication, and contains the sub carrier numbers as the designation information in the downlink feedback information.

Further, when the mobile station determines to perform the downlink sub carrier designation transmission, based on results of fading occurrence determination for sub carriers of each of the base stations #0 and #1, the mobile station determines sub carrier numbers to be used by each of the base stations #0 and #1 in the downlink communication and contains the sub carrier numbers as the notification information in the downlink feedback information.

The downlink feedback information is sent to each of the base stations #0 and #1 through the interfaces Uu for the uplinks (ST9, ST10).

The base station #0 performs the following processing based on the downlink feedback information (ST11). Specifically, the base station #0 recognizes the sub carrier numbers to be received in uplink communication, based on the designation information. Further, the base station #0 performs the reception power level measurement and the determination processing whether the fading has occurred for a signal received in the uplink communication. The base station #1 also performs the same processing as the processing performed by the base station #0, based on the downlink feedback information (ST12).

Each of the base stations #0 and #1 generates uplink feedback information based on the above-described processing (ST13, ST14). The uplink feedback information as described in ST1 and ST2 are generated. The above-described feedback loop is formed between the multiple base stations and the mobile station.

The terms of "transmission side" and "reception side" have been used for an explanation of the fading occurrence determination. In the uplink communication shown in the example of FIG. 5, the mobile station corresponds to the "transmission side" and each of the base stations #0 and #1 corresponds to the "reception side".

Figure 6:
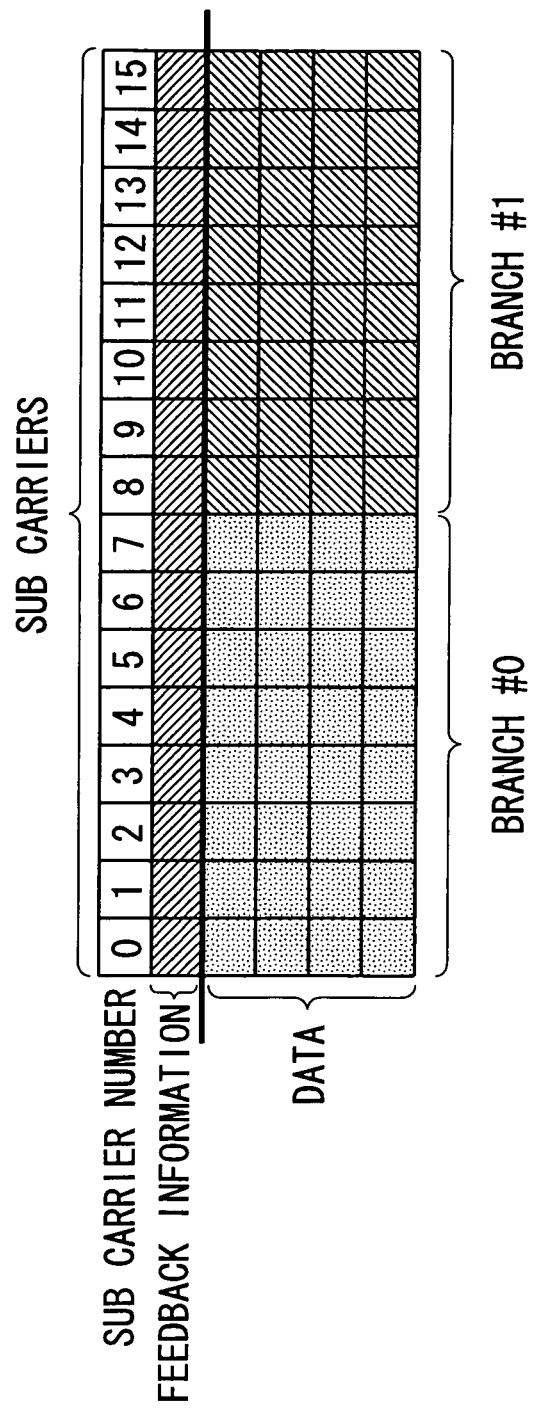
FIG. 6 is a diagram showing a relationship between data and downlink feedback information in uplink transmission.
Figure 7:
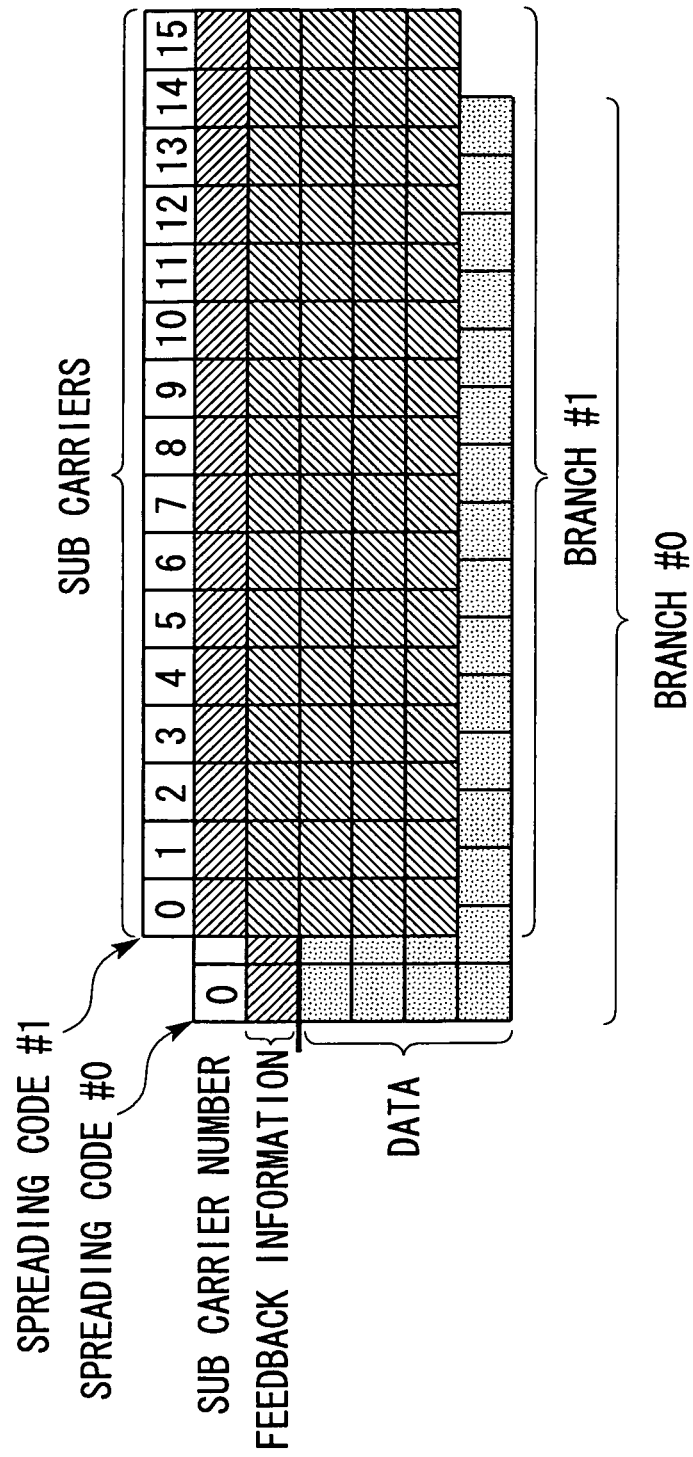
FIG. 7 is a diagram showing a relationship between data and uplink feedback information in downlink transmission (in a case where downlink sub carrier designation transmission is not performed).
Figure 8:
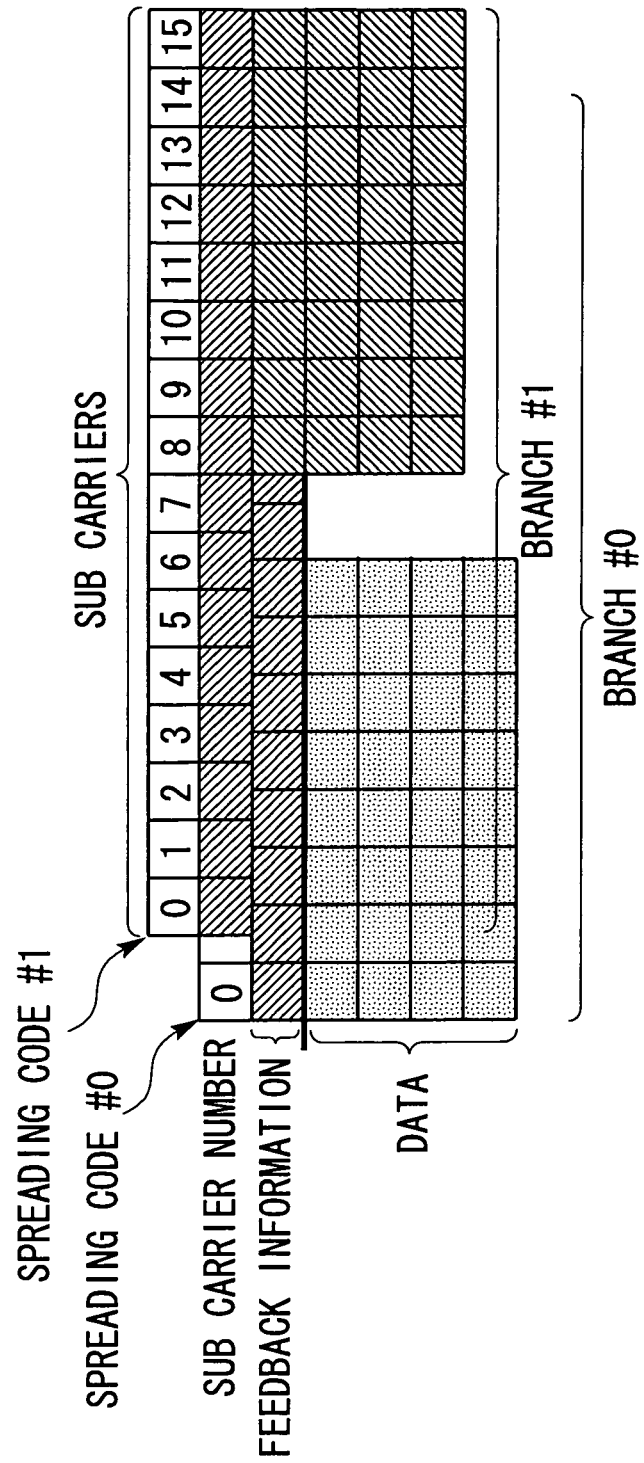
FIG. 8 is a diagram showing a relationship between data and uplink feedback information in downlink transmission (in a case where the downlink sub carrier designation transmission is performed).

FIGS. 6 to 8 are diagrams showing relationships between data and feedback information to be exchanged between the mobile station and each of the base stations #0 and #1, in the above-described feedback loop. In examples shown in FIGS. 6 to 8, it is assumed that two branches #0 and #1 and 16 sub carriers are used.

FIG. 6 is a diagram showing the relationship between data and downlink feedback information in uplink transmission. FIG. 6 shows a multicarrier signal (OFCDM signal) to be sent from the mobile station in uplink transmission.

As shown in FIG. 6, the downlink feedback information is sent together with data to the base stations (branches) #0 and #1 through an uplink. FIG. 6 shows an example in which, according to determination and designation made by the mobile station, a part of the multicarrier signal which corresponds to sub carriers #0 to #7 is received by the branch (base station) #0 and the other part thereof which corresponds to sub carriers #8 to #15 is received by the branch (base station) #1.

Note that dividing the signal into the two parts (areas), to be received by the branches, as shown in FIG. 6 is not necessarily performed. In other words, separated sub carrier numbers may be assigned to each branch. For example, the sub carriers may be alternately assigned to the branches #0 and #1.

Note that, in FIG. 6, it can be considered that data stored in the data area is one data block, and the part to be received by the branch #0 is a first data block and the part to be received by the branch #1 is a second data block.

FIG. 7 is a diagram showing the relationship between data and uplink feedback information in downlink transmission (in a case where the downlink sub carrier designation transmission is not performed). FIG. 7 shows multicarrier signals (OFCDM signals) to be sent to the mobile station through the branches #0 and #1 for downlink.

When the downlink sub carrier designation transmission is not performed, OFCDM signals using all the sub carriers (#0 to #15) are sent to the branches #0 and #1. FIG. 7 shows the OFCDM signal sent through the branch #0, which includes data spread by spreading code #0 and the OFCDM signal sent through the branch #1, which includes data spread by spreading code #1. Each of the OFCDM signals includes downlink feedback information including fading information of the sub carriers #0 to #15.

FIG. 8 is a diagram showing the relationship between data and uplink feedback information in downlink transmission (in a case where the downlink sub carrier designation transmission is performed).

FIG. 8 shows OFCDM signals to be sent from the base stations #0 and #1 when, regarding downlink transmission, it is determined that the sub carriers #0 to #7 are used by the base station (branch) #0 and the sub carriers #8 to #15 are used by the base station (branch) #1. Each of the OFCDM signals does not include data areas corresponding to sub carriers that are not used.

Therefore, the amount of data to be sent through each of the branches is reduced to efficiently use resources and to prevent a signal of a certain branch from causing noise in a signal of another branch.

Note that, in FIGS. 7 and 8, the data contained in the OFCDM signals may be identical, or may be division data (segments) into which a given data is divided.

<<Uplink Feedback Information>>

FIG. 9 is a diagram showing a structural example of uplink feedback information. The uplink feedback information is added to transmission target data at the time of downlink transmission.

In the example shown in FIG. 9, an OFCDM signal includes, as uplink feedback information, a bitmap (fading information) indicating whether fading has occurred at each sub carrier for an uplink and a bitmap (sub carrier division information) indicating a sub carrier to be received by the mobile station (UE).

The fading information is related to reception of an uplink signal at each base station and also to the fading occurrence state of each sub carrier obtained by the above-described fading occurrence determination method (for example, the first method or the second method). The fading information is formed of a bit (0 (not occurred) or 1 (occurred)) indicating whether fading has occurred or not at each sub carrier, for example.

The sub carrier division information indicates sub carrier numbers (used by each base station) to be received by the mobile station, which have been notified as downlink feedback information from the mobile station to each base station. For example, the sub carrier division information is a bit string corresponding to the number of sub carriers. A sub carrier number that is to be received is expressed by "1" and a sub carrier number that is not to be received is expressed by "0".

Note that the fading information is mandatory information in a case where fading occurrence determination is performed in the base station. However, when the first method is performed in the mobile station, determination processing is not performed in the base station (reception side), so fading information is not included in this case.

The sub carrier division information is notified from the mobile station to each base station, which means that the base station receives designation from the mobile station. Therefore, the sub carrier division information is defined as an option.

<<Downlink Feedback Information>>

FIG. 10 is a diagram showing a structural example of downlink feedback information. The downlink feedback information is added to transmission target data at the time of uplink transmission.

In an example shown in FIG. 10, the downlink feedback information (sub carrier division information included in the downlink feedback information) includes a bitmap (uplink reception target sub carrier information) indicating sub carriers to be received through uplink by each base station and a bitmap (downlink reception target sub carrier information) indicating sub carriers to be received by the mobile station (UE) from each base station.

The uplink reception target sub carrier information indicates sub carrier numbers to be received by each base station. The downlink reception target sub carrier information indicates sub carrier numbers to be received by the mobile station (in other words, sub carrier numbers to be sent by the each base station).

The uplink/downlink reception target sub carrier information is prepared for each base station (branch). Further, the uplink/downlink reception target sub carrier information is made up of a bit string corresponding to the total number of sub carriers, for example. A sub carrier that is to be received by each base station or the mobile station is expressed by "1", and a sub carrier that is not to be received by each base station or the mobile station is expressed by "0".

The uplink reception target sub carrier information is included as mandatory information in the downlink feedback information. However, when all sub carriers are to be received by each branch, the uplink reception target sub carrier information may be omitted.

On the other hand, the downlink reception target sub carrier information is defined as an option which is included in the downlink feedback information only when the downlink sub carrier designation transmission is performed.

Note that information indicating a sub carrier number, included as the sub carrier division information, may be the target sub carrier number itself.

<<Sub Carrier Assignment Determination>>

The mobile station determines sub carriers to be assigned to each of the branches (base stations) based on fading information obtained through determination processing performed in itself or obtained as feedback information.

FIGS. 11 and 12 show tables showing examples of assignment of sub carriers based on a fading occurrence state. The mobile station assigns sub carriers to each of the branches such that a sub carrier at which fading has occurred is not used by each of the branches.

FIGS. 11 and 12 show examples of cases where 12 sub carriers are assigned to the branches #0 and #1. In the example shown in FIG. 11, fading has occurred at sub carriers #2 and #3 in the branch #0, and at a sub carrier #8 in the branch #1.

Therefore, in order to prevent those sub carriers at each of which fading has occurred from being assigned to each of the branches #0 and #1, it is determined that sub carriers #6 to #12 are assigned to the branch #0 and sub carriers #1 to #5 are assigned to the branch #1.

When the table of FIG. 11 is used for uplink, the branches (base stations) #0 and #1 can receive an OFCDM signal which is not influenced by fading, from the mobile station. In contrast, when the table of FIG. 11 is used for downlink, the mobile station can receive an OFCDM signal which is not influenced by fading, from each of the branches (base stations) #0 and #1.

As described above, in this embodiment, a sub carrier candidate group which includes multiple sub carriers (sub carriers #1 to #12) can be divided into a first sub carrier group (#6 to #12) and a second sub carrier group (#1 to #5).

As shown in FIG. 12, there is a case where a sub carrier at which fading has occurred has to be assigned depending on a fading occurrence state.

In FIG. 12, fading has occurred at sub carriers #3 and #11 in the branch #0, and at sub carriers #2, #6, and #11 in the branch #1. When all the sub carriers have to be assigned to the branches #0 and #1, the assignment is performed such that the ratio of the number of sub carriers at which fading has occurred to the number of sub carriers assigned to the branch (the proportion of sub carriers at which fading has occurred to sub carriers assigned to the branch) becomes nearly equal between the branches (sub carriers at which fading has occurred/sub carriers assigned (to the branch #0))≈(sub carriers at which fading has occurred/sub carriers assigned (to the branch #1)).

In an example shown in FIG. 12, sub carriers #6 to #12 are assigned to the branch #0 and sub carriers #1 to #5 are assigned to the branch #1. Note that when it is possible for all the branches to avoid using a sub carrier at which fading has occurred, the sub carrier #11 can be prevented from being assigned.

When an OFCDM system is used, spectrum spreading is applied to an information symbol according to a spreading factor (SF). Accordingly, it is conceivable that, instead of the sub carriers as described above, a group to be spread according to the SF is defined as a minimum unit to be assigned to each branch.

Figure 13:
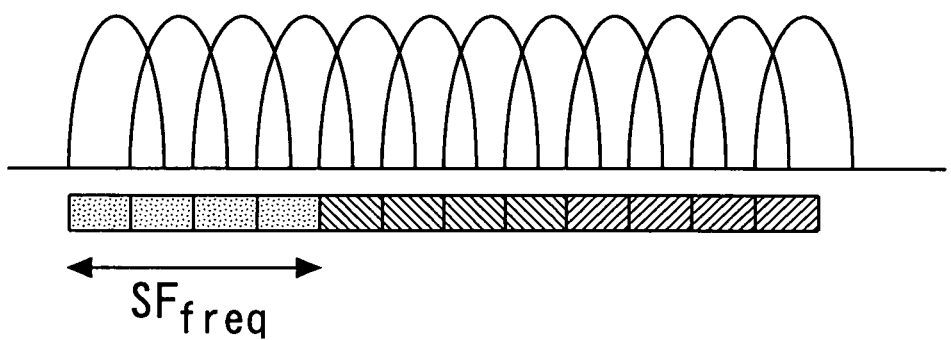
FIG. 13 is a diagram showing a relationship between SF and sub carriers.

FIG. 13 is a diagram showing a relationship between the SF and sub carriers. FIG. 13 shows a case where SF is set to 4. In this case, one group is formed of four sub carriers corresponding to SF (the number of chips of spreading code) and assignment is determined in units of groups.

FIG. 14 shows an example of assignment performed when SF is set to 4. In FIG. 14, according to SF, sub carriers #1 to #4 form a group #0, sub carriers #5 to #8 form a group #1, and sub carriers #9 to #12 form a group #2. The fading occurrence state with respect to the sub carrier number #11 is the same as that of FIG. 12. The groups #0 and #1 are assigned to the branch #1, and the group #2 is assigned to the branch #0.

<<Assignment Changing Method>>

The above-described assignment processing of sub carriers to each branch is performed when uplink/downlink communication is started, for example. Thereafter, the assignment state can be changed as needed. In this case, one of the following methods can be used: (1) a method in which the assignment state of sub carriers is properly changed by real-time processing; and (2) a method in which the assignment state of the carries is changed (reviewed) at a constant frequency.

<Structural Example of the Mobile Station and the Base Stations>

Figure 15:
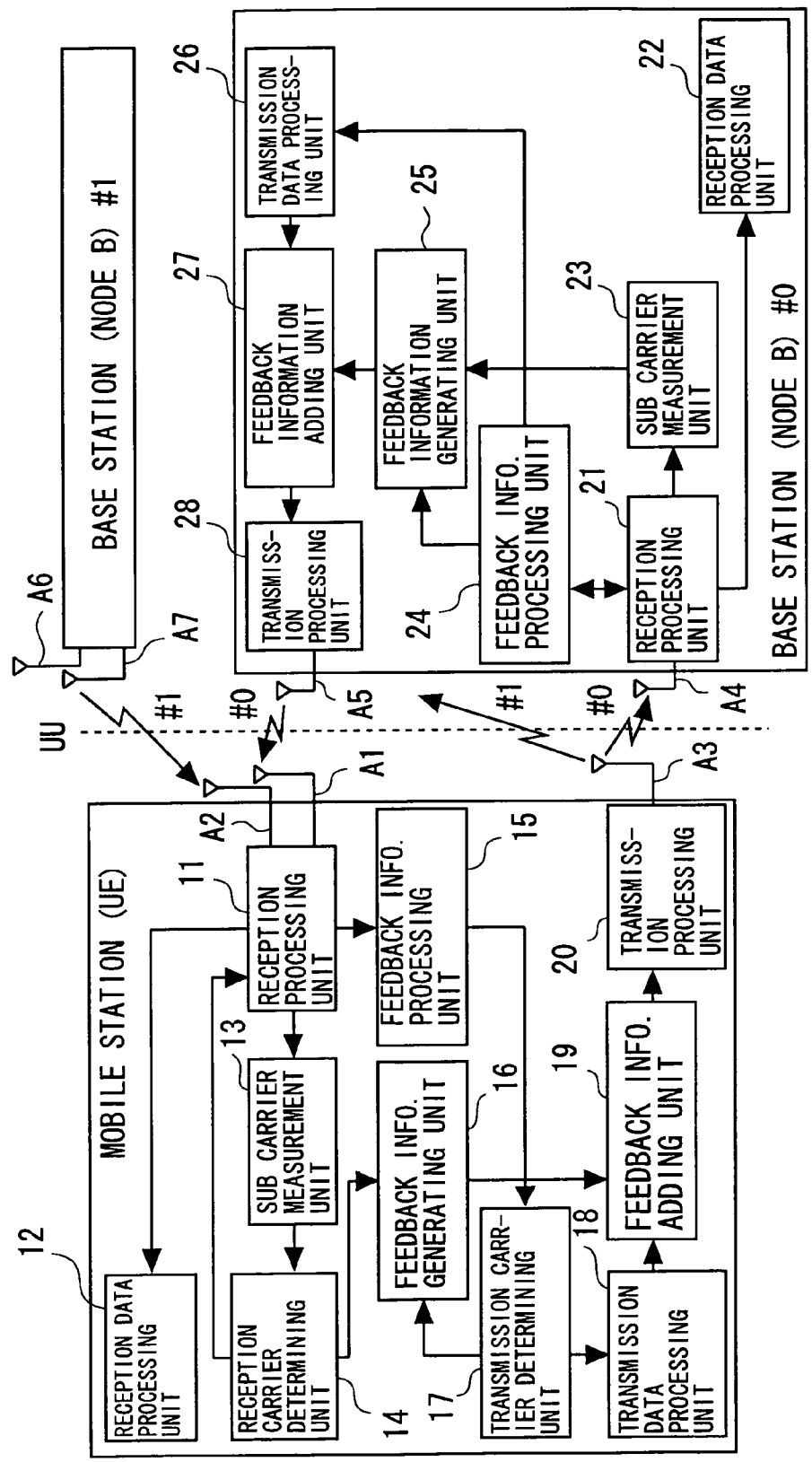
FIG. 15 is a diagram showing a structural example of a mobile station and base stations (nodes B) in an embodiment.

Next, a description is given of a structural example of the mobile station and the base stations, serving as radio communication devices to realize the above-described processings and functions. FIG. 15 is a diagram showing a structural example of the mobile station and the base stations (nodes B). FIG. 15 shows the base stations #0 and #1 and the mobile station (mobile terminal) for performing radio communication with each of the base stations #0 and #1 through two branches #0 and #1 established between the mobile station and the base stations #0 and #1.

(Mobile Station)

The mobile station includes a reception processing unit 11 serving as a radio reception unit, a reception data processing unit 12, a sub carrier measuring unit 13, a reception carrier determining unit 14, a feedback information processing unit 15, a feedback information generating unit 16, a transmission carrier determining unit 17 serving as a sub carrier setting unit and a control unit, a transmission data processing unit 18 serving as a data generating unit, a feedback information adding unit 19, and a transmission processing unit 20 serving as an information transmission unit.

The reception processing unit 11 is connected to multiple antennas (first antenna A1 and second antenna A2) of the mobile station. The first antenna A1 receives a downlink OFCDM signal sent from the base station #0, and the second antenna A2 receives a downlink OFCDM signal sent from the base station #1. However, only one reception antenna may be provided.

The reception processing unit 11 performs reception processing of the OFCDM signals received at the antennas A1 and A2. As the reception processing, the reception processing unit 11 performs demodulation processing of each of the OFCDM signals. As the demodulation processing of each of the OFCDM signals, the reception processing unit 11 performs removal of a guard interval (GI), Fourier transformation (FFT), spreading code multiplication, combining of symbols, parallel-serial conversion, and data demodulation (for example, QPSK demodulation).

At this time, the reception processing unit 11 sends data (downlink feedback information) stored in the feedback information area of each of the OFCDM signals to the feedback information processing unit 15 (on the assumption that error-correction encoding or interleaving is not applied to the feedback information).

After data in the data area of each of the OFCDM signals has been demodulated, when the downlink sub carrier designation communication is not currently performed, the reception processing unit 11 applies de-interleaving and error correction demodulation to the pieces of data, selects one of the resultant pieces of data (for example, data having a higher reception level), and sends the selected data to the reception data processing unit 12. At this time, it is possible to combine the two pieces of data to obtain data with improved quality and send this data to the reception data processing unit 12.

In contrast to this, after data in the data area of each of the OFCDM signals has been demodulated, when the downlink sub carrier designation communication is currently performed, the reception processing unit 11 assembles the demodulated pieces of data, applies de-interleaving and error correction demodulation to the assembled data, and sends finally-obtained data to the reception data processing unit 12.

Further, the reception processing unit 11 sends the demodulated data and the downlink feedback information to the sub carrier measuring unit 13 as measurement data used for measuring reception levels.

The reception data processing unit 12 performs predetermined processing based on the data received from the reception processing unit 11.

The sub carrier measuring unit 13 uses the measurement data to perform reception level determination processing (fading occurrence determination processing) for each sub carrier for each of the base stations #0 and #1. The determination result is sent to the reception carrier determining unit 14.

The reception carrier determining unit 14 identifies (recognizes) a sub carrier at which fading has occurred (fading occurrence state) based on the determination result of each of the base stations, received from the sub carrier measuring unit 13. Based on this identification (recognition) result, the reception carrier determining unit 14 determines sub carriers (downlink reception target sub carriers) to be received by the mobile station, which are to be assigned to each base station (branch) (performs assignment of sub carriers to each branch). This determination (assignment) result is sent to the feedback information generating unit 16.

As described above, the reception carrier determining unit 14 determines whether to perform the downlink sub carrier designation transmission, described in an explanation of the feedback loop (FIG. 5). For example, when fading has not occurred in each branch, the reception carrier determining unit 14 can determine that all sub carriers are used in each branch. In this case, notification to the feedback information generating unit 16 is not performed.

The reception carrier determining unit 14 notifies the determination result of reception target sub carriers to the reception processing unit 11. With this notification, the reception processing unit 11 performs the reception processing for the reception target sub carriers, which have been specified as the determination result, for each of the base stations #0 and #1.

The feedback information processing unit 15 identifies (recognizes) a sub carrier at which fading has occurred, for each of the branches #0 and #1, based on the fading information included in the downlink feedback information sent from each of the base stations #0 and #1, the downlink feedback information being received from the reception processing unit 11. At this time, it is also possible, if necessary, that the feedback information processing unit 15 performs reception level determination processing for each sub carrier of the OFCDM signal sent from each base station, and combines this determination result with the fading information to perform final fading occurrence determination processing (the third method). The feedback information processing unit 15 notifies the recognition result obtained through the above-mentioned processing (alternatively, the fading information) or the determination result to the transmission carrier determining unit 17. The feedback information processing unit 15 also recognizes designation information on uplink reception target sub carriers, included in uplink feedback information.

The transmission carrier determining unit 17 determines sub carriers (uplink reception target sub carriers) to be received by the each of the base stations #0 and #1 in uplink communication, based on the notification (fading occurrence state) from the feedback information processing unit 15. In other words, the transmission carrier determining unit 17 assigns sub carrier numbers for which reception processing is to be performed, to each base station. The determination (assignment) result is notified to the feedback information generating unit 16 and the transmission data processing unit 18.

Note that the transmission carrier determining unit 17 can also determine to use all sub carriers for all the branches when it is determined that fading has not occurred in any branch, based on the fading occurrence state.

The feedback information generating unit 16 generates downlink feedback information to be notified to each of the base stations #0 and #1. The downlink feedback information includes sub carrier division information. The sub carrier division information is generated based on the determination result of the downlink reception target sub carriers, sent from the reception carrier determining unit 14, and the determination result of the uplink reception target sub carriers, sent from the transmission carrier determining unit 17. The feedback information generating unit 16 notifies the downlink feedback information to the feedback information adding unit 19.

The transmission data processing unit 18 applies error-correction encoding (for example, turbo encoding) and interleaving to transmission target data generated in the mobile station and destined for the base station side, and sends the resultant data to the feedback information adding unit 19.

The feedback information adding unit 19 adds the downlink feedback information to the input data, and inputs the input data and the downlink feedback information to the transmission processing unit 20.

The transmission processing unit 20 applies the following processing to the data and the downlink feedback information to be input, which are the transmission targets. Specifically, the transmission processing unit 20 applies data modulation processing (for example, QPSK modulation) to each of the data and the downlink feedback information.

Further, the transmission processing unit 20 performs, as modulation processing according to the OFCDM system, serial-parallel conversion, copying of an information symbol according to a spreading factor (SF), multiplying of each copy of the information symbol by spreading code, inverse fast Fourier transformation (IFFT), and insertion of a guard interval (GI). Accordingly, an OFCDM signal which includes the data and the downlink feedback information is generated.

The OFCDM signal is sent from an antenna A3. At this time, the antenna A1 or A2 may function as the antenna A3.

Note that when the branches use different sub carriers (when sub carriers are separately used) for uplink transmission, the mobile station can generate OFCDM signals directed to each base station. In this case, after error-correction encoding and interleaving are applied to transmission target data, the transmission data processing unit 18 divides the transmission target data destined for each base station.

At this time, the transmission data processing unit 18 calculates the ratio of sub carriers assigned to each of the base stations (branches), based on the determination result notified from the transmission carrier determining unit 17. According to the calculated ratio, the transmission data processing unit 18 divides the transmission target data into the same number of pieces of division data (segments: first data and second data) as the number of the base stations (branches).

In this case, the feedback information adding unit 19 adds the downlink feedback information to the segments. The transmission processing unit 20 applies the above-mentioned modulation processing to pairs of the segments and the downlink feedback information to generate OFCDM signals destined for the base stations, and sends the OFCDM signals to the base stations. In this case, different spreading code is used for each of the base stations.

Note that the transmission carrier determining unit 17 serving as the control unit can be configured such that, when a certain sub carrier is assigned to a first antenna (antenna A4) side and a second antenna (antenna A6) side, this sub carrier is assigned with a higher priority to an antenna side which sends a control signal (TPC information) that does not request to increase the transmission power at the sub carrier than an antenna side which sends a control signal (TPC information) that requests to increase the transmission power at the sub carrier.

(Base Station)

The base stations #0 and #1 have the same structure. A description is given of the base station #0 as an example. As shown in FIG. 15, the base station #0 includes a reception processing unit 21, a reception data processing unit 22, a sub carrier measuring unit 23 serving as a radio environment measuring unit, a feedback information processing unit 24, a feedback information generating unit 25, a transmission data processing unit 26, a feedback information adding unit 27, and a transmission processing unit 28.

The reception processing unit 21 is connected to the reception antenna A4. The reception antenna A4 receives a radio signal corresponding to an OFCDM signal sent from the antenna A3 of the mobile station through the branch #0 for uplink.

The reception processing unit 21 has almost the same structure as that of the reception processing unit 11 of the mobile station. Unlike the reception processing unit 11, however, the reception processing unit 21 does not assemble pieces of data sent between the base stations. The reception processing unit 21 performs the same demodulation processing as in the reception processing unit 11, and obtains data and uplink feedback information from the OFCDM signal.

However, when uplink reception target sub carriers are specified by the mobile station, the reception processing unit 21 applies the demodulation processing to data stored in the data areas of the uplink reception target sub carriers in the OFCDM signal.

The reception processing unit 21 sends the data to the reception data processing unit 22 and sends the uplink feedback information to the feedback information processing unit 24. Further, the reception processing unit 21 sends the data and the uplink feedback information to the sub carrier measuring unit 23 as measurement data used for measuring reception levels.

The reception data processing unit 22 performs predetermined processing regarding the data received from the reception processing unit 21.

The sub carrier measuring unit 23 uses the data and the feedback information sent from the reception processing unit 21, to perform the fading occurrence determination method which has been described as the second method. The result (the fading occurrence state and the fading occurrence determination result for each sub carrier) is sent to the feedback information generating unit 25.

The feedback information processing unit 24 refers to designation of the uplink reception target sub carriers (the sub carrier numbers for which reception processing is to be performed by the base station #0: designation information) included in the uplink feedback information to recognize that reception processing is to be performed for the sub carriers having the specified numbers. According to the recognition, the feedback information processing unit 24 instructs the reception processing unit 21 to perform reception processing only for the sub carriers having the specified numbers. This instruction is performed by notifying the designation information, for example.

Further, when the uplink feedback information includes downlink reception target sub carrier numbers (notification information), the feedback information processing unit 24 recognizes that downlink transmission is to be performed by using the specified sub carriers. The feedback information processing unit 24 notifies the downlink reception target sub carrier numbers to the feedback information generating unit 25 and the transmission data processing unit 26.

The feedback information generating unit 25 generates uplink feedback information including uplink fading information, which is the determination result sent from the sub carrier measuring unit 23, and the downlink reception target sub carrier numbers (sub carrier division information) sent from the feedback information processing unit 24, and notifies the uplink feedback information to the feedback information adding unit 27.

The transmission data processing unit 26 sends transmission target data (to which error-correction encoding and interleaving have been applied) destined for the mobile station to the feedback information adding unit 27. The feedback information adding unit 27 adds the uplink feedback information to the transmission target data and sends the transmission target data and the uplink feedback information to the transmission processing unit 28.

The transmission processing unit 28 has almost the same structure as that of the transmission processing unit 20 of the mobile station. The transmission processing unit 28 generates an OFCDM signal including the data and the uplink feedback information, sent from the feedback information adding unit 27, and sends the OFCDM signal to the mobile station through an antenna A5. A radio signal corresponding to the OFCDM signal is received at the antenna A1 through the branch #0 for downlink.

The base station #1 receives, at the antenna A6, a radio signal corresponding to an OFCDM signal sent from the antenna A3 of the mobile station through the branch #1 for uplink. Further, the base station #1 sends, from an antenna A7, a radio signal corresponding to an OFCDM signal destined for the mobile station. This radio signal is received at the antenna A2 of the mobile station through the branch #1 for downlink. Note that the antennas A4 and A5 can be configured by one antenna element, and the antennas A6 and A7 can also be configured by one antenna element.

Note that error-correction encoding and interleaving may be applied to the feedback information in the mobile station and the base stations, instead of the above-described structure.

<Application Example>

Next, as an application example, an embodiment in which the present invention is applied to a 3GPP mobile communication system will be described.

<<System Structure>>

Figure 16:
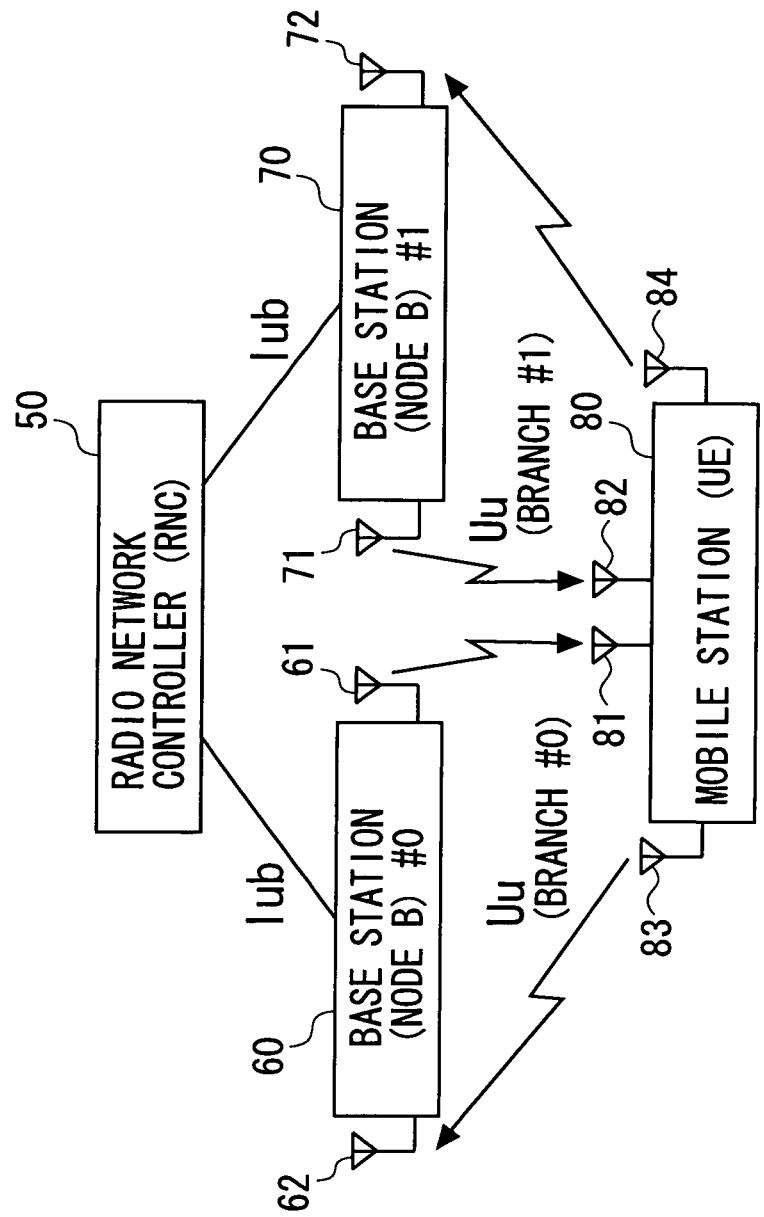
FIG. 16 is a diagram showing an example of a mobile communication system in an application example.

FIG. 16 is a diagram showing an example of a mobile communication system in the application example. In FIG. 16, the mobile communication system includes a base station control device (radio network controller (RNC)) 50 used in a radio access network, multiple base stations (base station devices: Nodes B) 60 and 70 connected to the base station control device 50 through interfaces Iub, and a radio mobile station (user equipment (UE)) 80 connected to each of the base stations 60 and 70 through radio interfaces Uu.

When DHO is performed for the mobile station 80 the mobile station 80 can communicate with the base stations 60 and 70 through radio transmission paths (branches #0 and #1) provided between the base station 60 and the mobile station 80 and between the base station 70 and the mobile station 80.

Specifically, when DHO is performed, data to be sent to the mobile station 80 is sent from the base station control device 50 to the base stations 60 and 70. The base stations 60 and 70 generate radio signals that include the data, and send the radio signals from their respective transmission antennas 61 and 71.

The respective signals are received by the mobile station 80 through the branches #0 and #1 for downlink. The mobile station 80 has antennas 81 to 84. For example, the mobile station 80 receives the radio signal from the base station 60 (#0) at the antenna 81 and receives the radio signal from the base station 70 (#1) at the antenna 82.

On the other hand, the mobile station 80 sends, from the antennas 83 and 84, radio signals (that include data to be sent to the base station control device 50) for uplink to the base stations 60 and 70. The base station 60 receives the signal sent from the mobile station 80 at its antenna 62. The base station 70 receives the signal sent from the mobile station 80 at its antenna 72. The base stations 60 and 70 extract the data from the received radio signals and send the data to the base station control device 50.

In a usual 3GPP system, when DHO is performed, identical data is sent to each base station in both downlink transmission and uplink transmission. In this embodiment, however, data to be sent to the base stations 60 and 70 is divided depending on the radio environments (quality of the radio transmission paths) between the mobile station 80 and the base stations 60 and 70.

Figure 17:
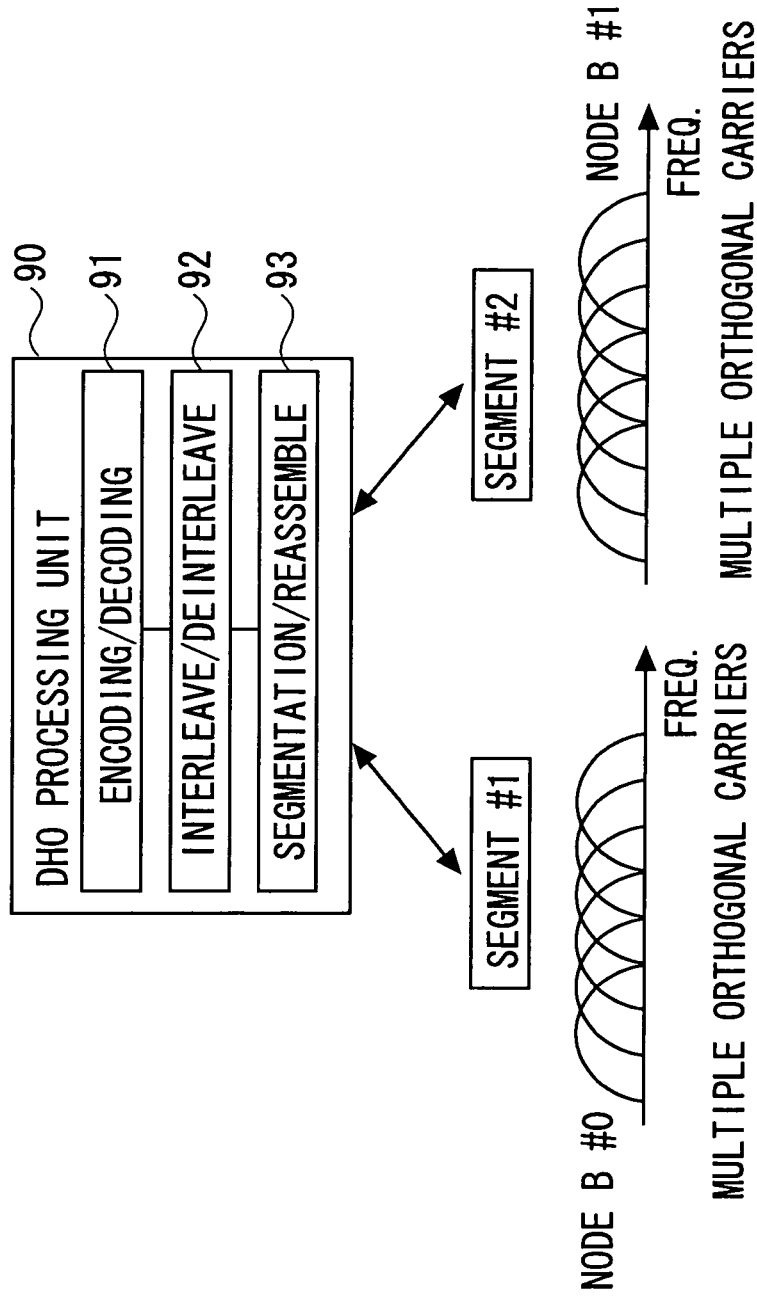
FIG. 17 is a diagram showing a structural example of a DHO processing unit.
Figure 18:
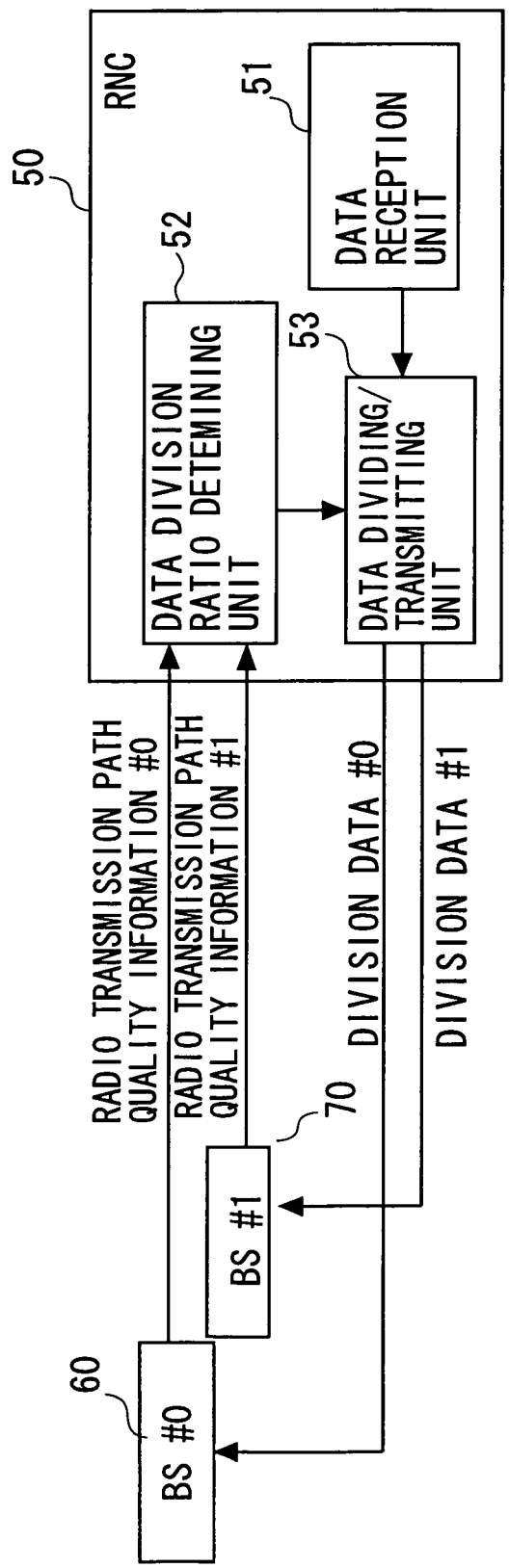
FIG. 18 is a diagram showing an example of a structure used to realize data division ratio determination processing.

FIG. 17 is a diagram showing a structural example of a DHO executing unit (DHO processing unit) provided to the base station control device 50. FIG. 18 is a diagram showing an example of a structure used to realize data division ratio determination processing to be performed in the base station control device 50. The structures shown in FIGS. 17 and 18 are structures according to the prior invention.

A DHO processing unit 90 shown in FIG. 17 is provided to the base station control device 50 in this application example. However, the DHO processing unit 90 may be provided to the base stations, an upper-level device (not shown) of the base station control device, or a mobile terminal.

The DHO processing unit 90 has a coding/decoding unit 91, an interleave/de-interleave unit 92, and a segmentation/reassemble unit 93.

Transmission target data destined for the mobile station 80 is subjected to error-correction encoding in the coding/decoding unit 91 and interleaving in the interleave/de-interleave unit 92. The interleaved data is divided according to the number of the base stations (branches) in the segmentation/reassemble unit 93. In this application example, the data is divided into two segments. The division data (segments) is sent from the base station control device 50 to the base stations 60 and 70.

Each of the base stations 60 and 70 generates an OFCDM signal which includes the segment received from the base station control device 50 and to be sent to the mobile station 80, and sends the OFCDM signal to the mobile station 80.

On the other hand, when segments are received from the base stations 60 and 70, the DHO processing unit 90 assembles the segments in the segmentation/reassemble unit 93. The assembled data is subjected to de-interleaving in the interleave/de-interleave unit 92 and error-correction decoding in the coding/decoding unit 91.

FIG. 18 shows a structure used to determine a data division ratio when the DHO processing unit 90 divides data. To determine the data division ratio, the base station control device 50 includes a data reception unit 51 which receives, from the upper-level device, transmission target data destined for the mobile station 80, a data division ratio determining unit 52 which determines the division ratio of the transmission target data based on radio transmission path quality information, and a data division/transmission unit 53 which divides the transmission target data according to the division ratio and sends them to the base stations 60 and 70. The DHO processing unit 90 is included in the data division/transmission unit 53.

Each of the base stations 60 and 70 sends radio transmission path quality information of its own radio transmission path (branch) to the base station control device 50. The radio transmission path quality information is given to the data division ratio determining unit 52.

In this application example, the numbers of sub carriers to be used by each of the base stations in the downlink sub carrier designation transmission are used as the radio transmission path quality information, the numbers of the sub carriers being received by each of the base stations from the mobile station.

The data division ratio determining unit 52 calculates, for each of the base stations (branches), the share of the number of sub carriers to be used (the sub carrier use ratio) to the total number of sub carriers from the radio transmission path quality information (the number of the sub carrier group to be used) sent from each of the base stations. The data division ratio determining unit 52 determines the data division ratio based on the use ratio.

For example, when the sub carrier use ratio is 50% in both the base station 60 (#0) and the base station 70 (#1), the data division ratio determining unit 52 determines the data division ratio to be 1:1. Note that the location where the data division ratio determining unit is placed can be changed correspondingly to the location where the DHO processing unit 90 is placed.

Figure 19:
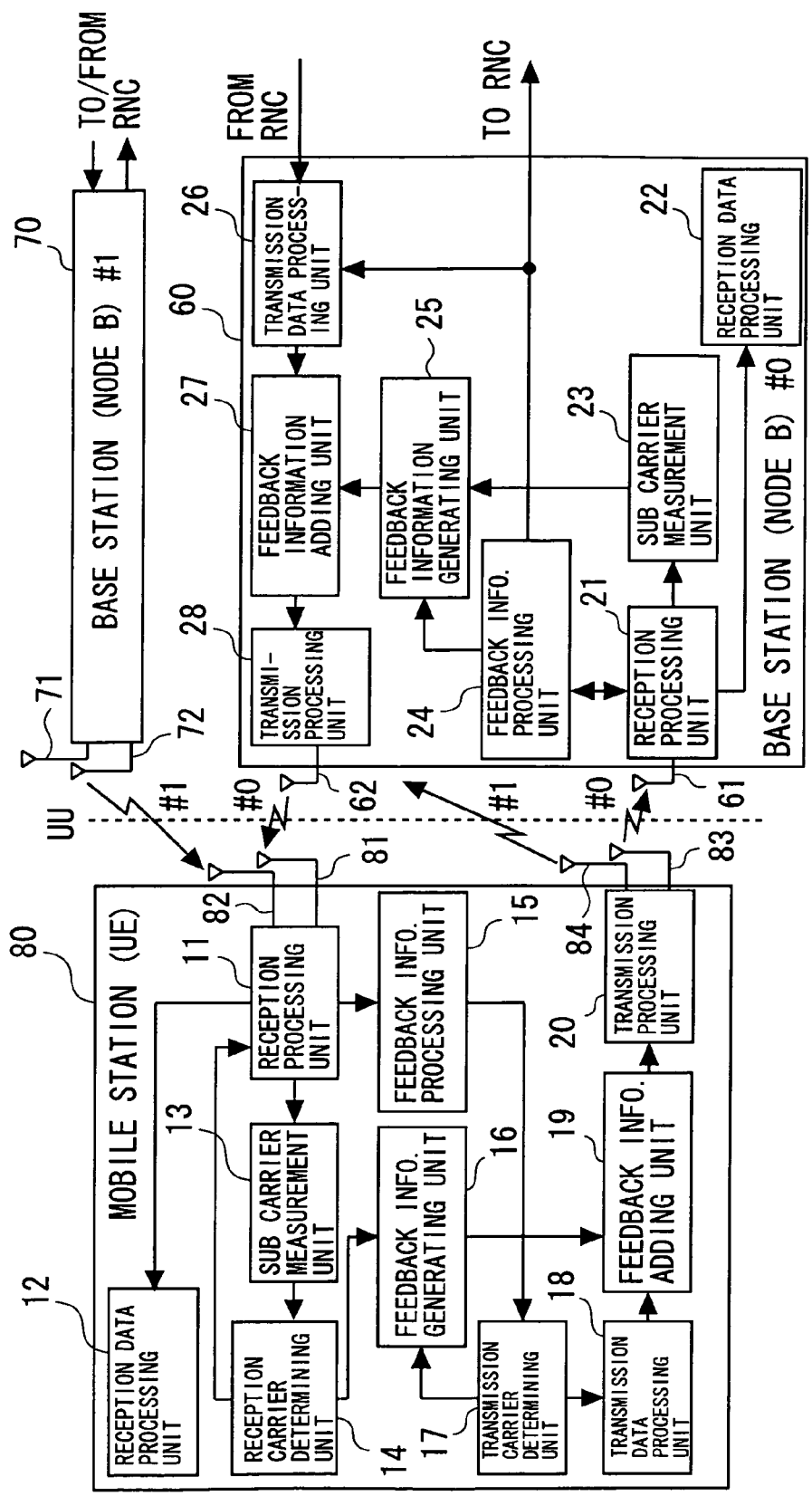
FIG. 19 is a diagram showing a structural example of base stations and a mobile station in the application example.

FIG. 19 is a diagram showing a structural example of the base stations 60 and 70 and the mobile station 80 in the application example. The base stations 60 and 70 and the mobile station 80, shown in FIG. 19, have almost the same structures as those of the base stations and the mobile station shown in FIG. 15. However, in the base stations 60 and 70, the transmission data processing units 26 receive data sent from the base station control device 50.

Further, the numbers of sub carriers (the number of a sub carrier group) to be used by each of the base stations in the downlink sub carrier designation transmission are sent from the feedback information processing unit 24 to the base station control device 50 as the radio transmission path quality information.

Note that, when the downlink sub carrier designation transmission is not performed, the mobile station 80 may perform an operation in which the fading occurrence rate of each branch is obtained from the fading occurrence state of each sub carrier, and the fading occurrence rate is included in the downlink feedback information, instead of the downlink reception target sub carrier numbers. In this case, the fading occurrence rate of each branch is notified to the data division ratio determining unit 52 of the base station control device 50. At this time, the data division ratio determining unit 52 can determine the ratio of the fading occurrence rates of the branches as the data division ratio. Instead of the fading occurrence rate, the ratio of available sub carriers may be obtained.

<<Uplink Transmission>>

Figure 20:
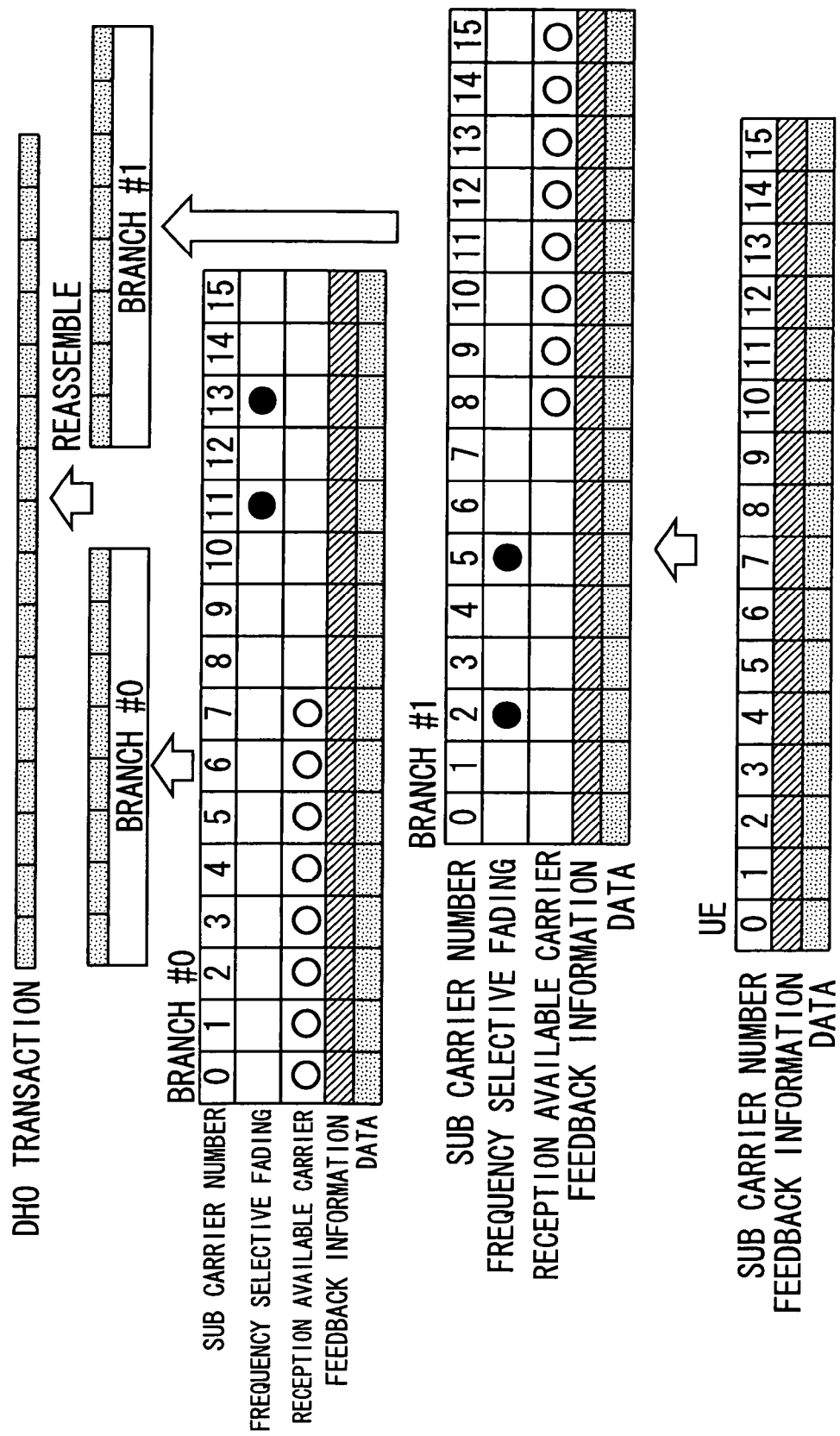
FIG. 20 is an explanatory diagram showing an example of uplink transmission in the application example.

FIG. 20 is an explanatory diagram showing an example of uplink transmission in the application example. First, before communication is started, the mobile station 80 and each of the base stations 60 and 70 determine a sub carrier group to be received by each of the base stations 60 (#0) and 70 (#1), based on feedback information. The determination result (the number of the uplink reception target sub carrier group for each of the base stations) is notified from each of the base stations 60 and 70 to the base station control device 50 (DHO processing unit 90) as needed. At this time, information used for de-interleaving and error-correction decoding in the base station control device 50 may be notified from the mobile station 80 to the base station control device 50.

For uplink transmission, the mobile station 80 applies error-correction encoding and interleaving to transmission target data and sends the data by using all sub carriers (sub carriers #0 to #15 in FIG. 20).

Each of the base stations 60 and 70 receives only data carried by target sub carriers according to the reception available carriers (uplink reception target sub carrier numbers) determined in advance, in reception of the data sent from the mobile station 80.

In FIG. 20, the reception target sub carriers for the base station 60 (branch #0) are sub carriers #0 to #7, and the reception target sub carriers for the base station 70 (branch #1) are sub carriers #8 to #15. Each of the base stations 60 and 70 performs reception processing of data for the reception target sub carriers. However, reception processing of feedback information is performed for all the sub carriers. Each of the base stations 60 and 70 reproduces the data received at the reception target sub carriers. Accordingly, the segment obtained by dividing the data sent from the mobile station 80 is generated. Each of the base stations 60 and 70 sends the corresponding segment to the base station control device (RNC) 50.

The base station control device 50 (DHO processing unit 90) performs assembling processing of the segments received from the base stations 60 and 70, de-interleaving, and error-correction decoding. As a result, the data sent from the mobile station 80 is reproduced.

<<Downlink Transmission>>

Figure 21:
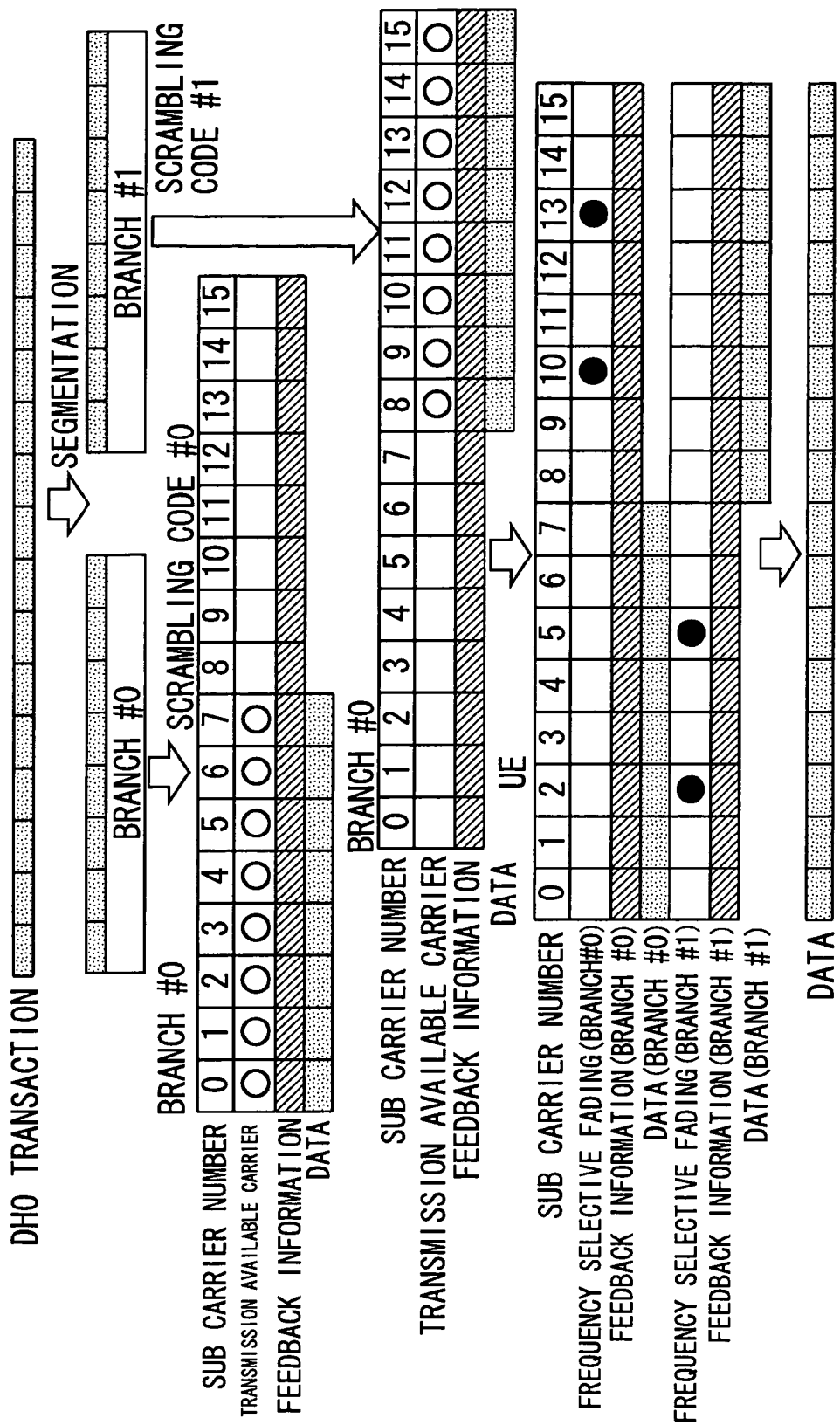
FIG. 21 is an explanatory diagram showing an example of downlink transmission in the application example.
Figure 22:
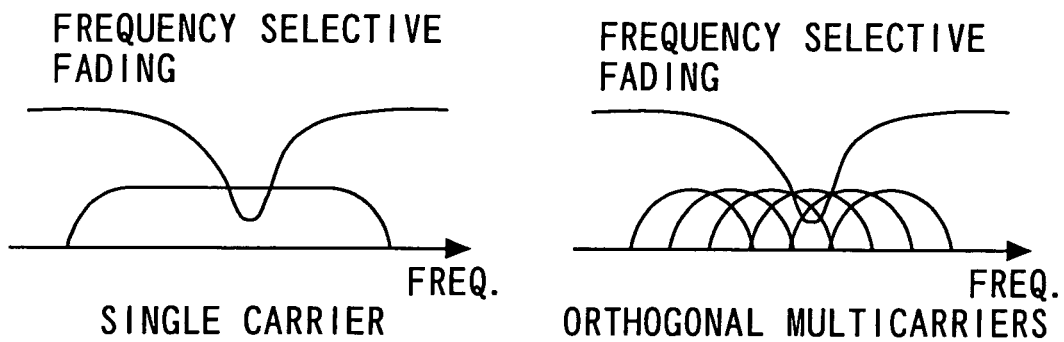
FIG. 22 is a diagram showing differences in influences of frequency selective fading on a single carrier signal and an orthogonal multicarrier signal.
Figure 23:
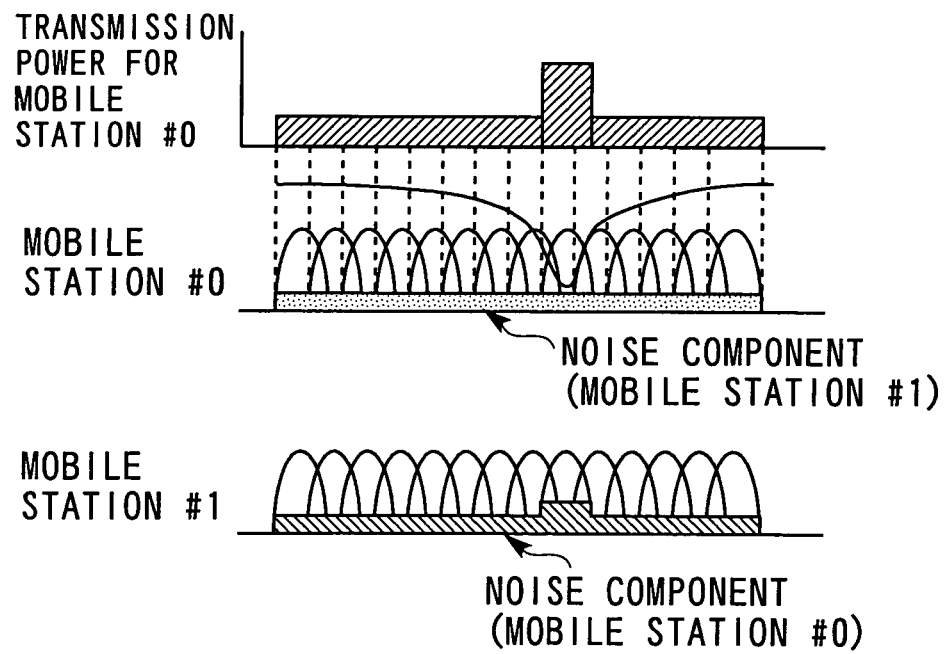
FIG. 23 is a diagram showing how an increase in transmission power in a sub carrier of a mobile station affects a sub carrier of another mobile station.

FIG. 21 is an explanatory diagram showing an example of downlink transmission in the application example. In FIG. 21, a case where the downlink sub carrier designation transmission is performed is shown.

For downlink transmission, before communication is started, the mobile station 80 and each of the base stations 60 and 70 determine a sub carrier group to be sent by each of the base stations 60 and 70, based on feedback information.

The determined information (downlink reception target sub carrier numbers) is notified to the base station control device 50. In the base station control device 50, the data division ratio determining unit 52 determines a data division ratio. For the downlink transmission, the DHO processing unit 90 applies error-correction encoding and interleaving to data to be sent to the mobile station 80, divides the data into segments (divisions) according to the data division ratio determined in advance, and sends each of the segments to the corresponding base station.

Each of the base stations 60 and 70 sends the division data (segment) received from the base station control device 50, by using the transmission available sub carriers (downlink transmission target sub carriers) determined in advance.

In an example shown in FIG. 21, the downlink transmission target sub carrier group for the base station 60 are sub carriers #0 to #7, and the transmission target sub carrier group for the base station 70 are sub carriers #8 to #15. The base station 60 sends the segment by using the sub carriers #0 to #7. The base station 70 sends the segment by using the sub carriers #8 to #15.

The mobile station 80 receives the division data (segments) from the base stations 60 and 70. The mobile station 80 assembles the multiple segments according to the contents of the error-correction encoding and the interleaving, notified in advance, and performs de-interleaving and error-correction decoding. As a result, the data sent from the base station control device 50 is reproduced.

Note that, at the time of downlink transmission, different spreading code for downlink transmission is used for each base station. Therefore, as a data division transmission method, each base station can use all sub carriers for downlink transmission (see FIG. 7), unlike in the example shown in FIG. 21, where each base station uses a part of the sub carriers.

In this case, as described above, a fading occurrence rate of each branch for downlink or the ratio of available sub carriers may be sent as the downlink feedback information to the data division ratio determining unit 52 to determine a data division ratio.

Note that, in the application example, the downlink feedback information may include identification information of a base station which reproduces data received from the mobile station 80.

Note that each base station (for example, the transmission processing unit) serving as a radio communication device may include a sub carrier count changing unit (sub carrier control unit) which increases, as needed, the number of sub carriers to be used to send transmission target data (segment) (for example, increases from a natural number of N to M) and a spreading factor control unit which changes a spreading factor (SF) corresponding to a change in the number of sub carriers (reduces (increases) the spreading factor when the number of sub carriers is increased (reduced)).

<Effects of Embodiment>

According to the embodiment described above, when there are multiple radio transmission paths (branches) between base stations and a mobile station, frequency selective fading occurrence determination processing is performed for each sub carrier for uplink transmission and downlink transmission that use those branches. Based on the determination result, reception target or transmission target sub carriers (sub carrier group) are assigned to each branch (base station).

Accordingly, the sub carriers can be assigned such that a sub carrier at which fading has occurred is not used in each branch. As a result, high-quality uplink or downlink transmission and reception can be performed.

Further, since a sub carrier at which fading has occurred is not used, it is unnecessary to perform transmission power control for the sub carrier. Therefore, it is possible to prevent noise caused by an increase in transmission power of a certain sub carrier from occurring in another sub carrier.

Further, data is divided into multiple segments to thereby achieve a reduction in amount of data to be sent through each branch. As a result, efficient communication and effective use of resources can be achieved.

Further, a sub carrier that is not used between a certain base station and the mobile station can be assigned to communication between another base station and the mobile station. As a result, radio resources can be effectively used.

Further, when the mobile station divides data into segments and sends each segment to each branch, the amount of data to be sent through each branch can be reduced, and therefore, efficient communication and effective use of radio resources can be achieved.

<Others>

The disclosures of international application PCT/JP2005/015478 filed on Aug. 25, 2005 including the specification, drawings and abstract are incorporated herein by reference.

What is claimed is:

1. A mobile terminal, comprising:
   a transmitter operable to perform radio transmission of first data by using a first sub carrier group according to an orthogonal frequency divisional multiplexing (OFDM) method and operable to perform radio transmission of second data by using a second sub carrier group according to the OFDM method;
   a receiver operable to receive signals from a plurality of antennas included in at least one base station;
   a determiner operable to determine sub carrier group used by each of the plurality of antennas in a downlink communication based on the signals received by the receiver, wherein the transmitter transmits information including the determined sub carrier group to the at least one base station;
   a radio environment measurement unit operable to measure radio environments of a plurality of sub carriers between a first antenna included in a base station and the mobile terminal and radio environments of a plurality of sub carriers between a second antenna included in a base station and the mobile terminal; and
   a sub carrier setting unit operable to set the first sub carrier group and the second sub carrier group based on results of the measurement, wherein the base station having the first antenna performs reception processing for data transmitted by the first sub carrier group and the base station having the second antenna performs reception processing for data transmitted by the second sub carrier group, and
   wherein the determiner determines the sub carrier group corresponding to each of the first and second antennas so that a proportion of sub carriers at which fading has occurred to sub carriers assigned to the first and second antennas becomes equal between the first and second antennas.

2. The mobile terminal according to claim 1, wherein the first data and the second data are a part of error-correction encoded data.

3. The mobile terminal according to claim 1, wherein the transmitter transmits information which identifies sub carriers included in the first sub carrier group and sub carriers included in the second sub carrier group among a plurality of sub carriers.

4. The mobile terminal according to claim 3, wherein the transmitter performs transmission using at least one of the first sub carrier group and the second sub carrier group.

5. The mobile terminal according to claim 3, wherein the information includes information to identify at least one base station performing reproduction processing of each of the first data and the second data.

6. The mobile terminal according to claim 1, wherein the first sub carrier group and the second sub carrier group are sub carrier groups obtained by dividing a sub carrier candidate group which includes a plurality of sub carriers based on a radio environment.

7. The mobile terminal according to claim 1, wherein the OFDM method is an orthogonal frequency and code division multiplexing (OFCDM) method which uses code division, and a minimum unit of information to be transmitted by using the first sub carrier group and second sub carrier group is equal to a chip length of spreading code.

8. The mobile terminal according to claim 1, wherein the OFDM method is an orthogonal frequency and code division multiplexing (OFCDM) method which uses code division, and each of the first sub carrier group and the second sub carrier group includes sub carriers equal to or larger than a number of sub carriers determined by a spreading factor.

9. The mobile terminal according to claim 1, wherein the OFDM method is an orthogonal frequency and code division multiplexing (OFCDM) method which uses code division, and the OFCDM method uses a plurality of sub carrier groups having a group including sub carriers equal to a number of chips of spreading code.

10. The mobile terminal according to claim 1, wherein the receiver receives control signals for transmission power control for each sub carrier that are generated based on reception quality evaluation relating to a first antenna and a second antenna, each of which receives signals transmitted by the radio transmission, and
   wherein the mobile terminal further comprises a controller operable to accord, upon assigning a plurality of sub carriers to a first antenna side and a second antenna side, the plurality of sub carriers, assignment relating to one of the first antenna side and the second antenna side that does not requests increase of transmission power by the control signal priority over assignment relating to another of the first antenna side and the second side that requests increase of transmission power by the control signal.

11. A mobile terminal, comprising:
   a receiver operable to receive different signals transmitted from a first antenna and a second antenna included in at least one base station according to an orthogonal frequency division multiplexing (OFDM) method;
   a determiner operable to determine sub carrier group used by each of the first antenna and the second antenna in a downlink communication with the at least one base station based on the signals received by the receiver; and
   a transmitter operable to transmit information including the determined sub carrier group to the at least one base station,
   wherein the determiner determines the sub carrier group corresponding to each of the first and second antennas so that a proportion of sub carriers at which fading has occurred to sub carriers assigned to the first and second antennas becomes equal between the first and second antennas.

12. A mobile terminal which transmits and receives a multicarrier signal that uses a plurality of sub carriers, comprising:
an acquisition unit operable to acquire, when there are a plurality of radio transmission paths for receiving multicarrier signals from a plurality of antennas included in at least one base station, radio environments of each of the radio transmission paths;
an assignment unit operable to assign sub carriers to be used for the mobile terminal receiving the multicarrier signals from the plurality of antennas in a downlink communication to each of the plurality of antennas based on the radio environments acquired by the acquisition unit;
a transmitter operable to transmit information including assignment results of the sub carriers to the at least one base station;
a radio environment measurement unit operable to measure radio environments of a plurality of sub carriers between a first antenna included in a base station and the mobile terminal and radio environments of a plurality of sub carriers between a second antenna included in a base station and the mobile terminal; and
a sub carrier setting unit operable to set the first sub carrier group and the second sub carrier group based on results of the measurement, wherein the base station having the first antenna performs reception processing for data transmitted by the first sub carrier group and the base station having the second antenna performs reception processing for data transmitted by the second sub carrier group, and
wherein the sub carrier setting unit determines the sub carrier group corresponding to each of the first and second antennas so that a proportion of sub carriers at which fading has occurred to sub carriers assigned to the first and second antennas becomes equal between the first and second antennas.

13. A base station apparatus, comprising:
a second antenna different from a first antenna that transmits first data to a mobile terminal by using a first sub carrier group;
a transmitter operable to transmit second data by using a second sub carrier group from the second antenna to the mobile terminal; and
a receiver operable to receive information indicating at least the second sub carrier group determined by the mobile terminal and used by the second antenna in a downlink communication from the first and second antenna to the mobile terminal,
wherein the mobile terminal includes a radio environment measurement unit operable to measure radio environments of a plurality of sub carriers between the base station apparatus and the mobile terminal and radio environments of a plurality of sub carriers between the other base station apparatus and the mobile terminal, and a sub carrier setting unit operable to set, based on results of the measurement, a first transmission sub carrier group used for transmitting data to the base station apparatus and a second transmission sub carrier group used for transmitting data to the other base station apparatus,
the base station apparatus performs reception processing for receiving data transmitted from the mobile terminal by using the first transmission sub carrier group and the other base station performs reception processing for receiving data transmitted from the mobile terminal by using the second transmission sub carrier group, and
wherein the sub carrier setting unit determines the first transmission sub carrier group and the second transmission sub carrier group corresponding to each of the base station apparatus and the other base station apparatus so that a proportion of sub carriers at which fading has occurred to sub carriers assigned to the base station apparatus and the other base station apparatus becomes equal between the base station apparatus and the other base station apparatus.

14. The base station apparatus according to claim 13, wherein the first antenna is provided to the base station apparatus or another base station apparatus.

15. The base station apparatus according to claim 13, wherein the first data and the second data are a part of error-correction encoded data.

16. The base station apparatus according to claim 13, further comprising a sub carrier selection unit operable to select the second sub carrier group from a plurality of sub carriers based on the information received from the mobile terminal.

17. The base station apparatus according to claim 16, wherein the information is generated at the mobile terminal according to a radio environment between the second antenna and the mobile terminal.

18. The base station apparatus according to claim 13, wherein the transmitter transmits, to the mobile terminal, reception quality information on a signal from the base station apparatus received at the second antenna.

19. A base station apparatus being capable of performing radio transmission according to an orthogonal frequency division multiplexing (OFDM) method, by using N sub carriers where N is a natural number, comprising:
at least one antenna among a plurality of antennas included in at least one base station containing the base station;
a receiver operable to receive, from a mobile terminal, information including a sub carrier group determined by the mobile terminal and used by each of the plurality of antennas in a downlink communication from the at least one base station to the mobile terminal;
a sub carrier control unit being capable of changing a number of sub carriers to be used by the at least one antenna for the radio transmission from N to a different number corresponding to the determined sub carrier group based on the information; and
a spreading factor control unit operable to perform a control to change a spreading factor in response to the change of the number of sub carriers,
wherein the mobile terminal includes a radio environment measurement unit operable to measure radio environments of a plurality of sub carriers between the base station apparatus and the mobile terminal and radio environments of a plurality of sub carriers between the other base station apparatus and the mobile terminal, and a sub carrier setting unit operable to set, based on results of the measurement, a first transmission sub carrier group used for transmitting data to the base station apparatus and a second transmission sub carrier group used for transmitting data to the other base station apparatus,
the base station apparatus performs reception processing for receiving data transmitted from the mobile terminal by using the first transmission sub carrier group and the other base station performs reception processing for receiving data transmitted from the mobile terminal by using the second transmission sub carrier group, and
wherein the sub carrier setting unit determines the first transmission sub carrier group and the second transmission sub carrier group corresponding to each of the base station apparatus and the other base station apparatus so that a proportion of sub carriers at which fading has occurred to sub carriers assigned to the base station apparatus and the other base station apparatus becomes equal between the base station apparatus and the other base station apparatus.

* * * * *